United States Patent [19]

Kassai

[11] E Patent Number: Re. 31,760

[45] Reissued Date of Patent: Dec. 11, 1984

[54] BABY CARRIAGE

[75] Inventor: Kenzou Kassai, Osaka, Japan

[73] Assignee: Kassai Kabushikikaisha, Osaka, Japan

[21] Appl. No.: 465,481

[22] Filed: Feb. 10, 1983

Related U.S. Patent Documents

Reissue of:

[64] Patent No.: 4,317,581
Issued: Mar. 2, 1982
Appl. No.: 141,265
Filed: Apr. 17, 1980

[30] Foreign Application Priority Data

| | | | |
|---|---|---|---|
| Oct. 13, 1979 | [JP] | Japan | 54-132136 |
| Nov. 9, 1979 | [JP] | Japan | 54-156262 |
| Feb. 6, 1980 | [JP] | Japan | 55-14370 |

[51] Int. Cl.[3] ..... B62B 7/06

[52] U.S. Cl. ..... 280/644; 280/42; 280/650; 280/658; 297/45; 297/DIG. 4

[58] Field of Search ..... 280/644, 650, 642, 647, 280/42, 658, 651, 649; 297/DIG. 4, 61, 45

[56] References Cited

U.S. PATENT DOCUMENTS

| | | | |
|---|---|---|---|
| 3,796,439 | 3/1974 | Perego | 280/644 |
| 3,799,567 | 3/1974 | Toda | 280/644 |
| 3,917,302 | 11/1975 | Gebhard | 280/644 |
| 3,929,374 | 12/1975 | Hogan et al. | 297/61 |
| 3,989,295 | 11/1976 | Sparks | 280/651 |
| 4,019,757 | 4/1977 | Beger et al. | 280/649 |
| 4,062,555 | 12/1977 | Peng et al. | 280/650 |
| 4,094,531 | 6/1978 | Cabagnero | 280/650 |

FOREIGN PATENT DOCUMENTS

| | | |
|---|---|---|
| 2300435 | 7/1974 | Fed. Rep. of Germany . |
| 2394435 | 2/1979 | France . |
| 2399937 | 4/1979 | France . |
| 171609 | 5/1983 | Japan . |
| 182021 | 6/1983 | Japan . |

OTHER PUBLICATIONS

1982 Baby Car, Satsuki, Jan. 1982, Japan.

*Primary Examiner*—David M. Mitchell
*Attorney, Agent, or Firm*—W. G. Fasse; D. F. Gould

[57] ABSTRACT

A baby carriage having a pair of front legs and a pair of rear legs. The pair of rear legs each have an angle bar pivotally connected thereto while the angle bar has a pusher rod pivotally connected to the other end thereof. With the baby carriage in the opened state, the angle bar is substantially in line with the associated pusher rod body. With the baby carriage in the closed state, the pusher bar body and the associated angle bar are in bent relation to each other, thus reducing the vertical dimension of the baby carriage. Further, in response to the turning movement of the angle bars relative to the rear legs, both the longitudinal and the transverse spacings between the front and rear legs are reduced. In this manner, the baby carriage is folded.

28 Claims, 46 Drawing Figures

BABY CARRIAGE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to improvements in a baby carriage, and more particularly it relates to improvements in a folding mechanism used in baby carriages of chair type construction.

2. Description of the Prior Art

Heretofore, a variety of basic baby carriage constructions have been proposed and put into practical use. Baby carriages of such proposed basic constructions include one having a chair type basic construction. A foldable version of such baby carriage of chair type basic construction has also been proposed.

However, such foldable baby carriages of chair type basic construction still have some points which remain to be improved. More particularly, such conventional type, when folded, is still bulky. Accordingly, it is desired that in folded condition, it has a much smaller size, in terms of height, width and length. Further, such conventional type, when folded, has its four wheels, front and rear, not on a level with each other, so that it is impossible for the baby carriage to stand by itself when folded. Accordingly, it is desired that the baby carriage has a construction which enables it to stand by itself when folded. Further, the folding operation of a such conventional type of baby carriage is not necessarily simple. Accordingly, there is a desire for a baby carriage which is simple to fold, for example, to the extent that it can be folded by one hand.

Further referring to the configuration of the baby carriage in folded condition described above, where it is designed to be carried on the user's arm in folded condition, it is desired that is can be fully decreased in height to assume a small bar form. It is also convenient that the user is allowed to walk while pulling the baby carriage in folded condition by making use of the rolling of the wheels. Further, such manner of conveyance requires that the baby carriage be sufficiently lightweight not to become a burden.

SUMMARY OF THE INVENTION

According to this invention, there is provided a baby carriage which meets the requirements described above.

Briefly, a baby carriage according to the invention comprises principal sections performing the three functions of means for supporting the baby carriage on the ground, means for initiating a folding operation, and operatively connecting means for effecting the folding operation in an operatively associated manner. The support means comprises a pair of front legs each having a wheel, a pair of rear legs each having a wheel, and connecting members for regulating the transverse spacing between the front legs and between the rear legs. The folding operation initiating means comprises a pair of pusher rod support angle bars pivotally connected, each at its one end, to the pair of rear legs and extending relatively upward, and a pair of pusher rod bodies pivotally connected at their lower ends to the other ends of said pusher rod support angle bars and extending relatively vertically. The operatively connecting means is operatively connected between the folding operation initiating means and the support means. When the pusher rod support angle bars are substantially downwardly turned owing to the downward displacement of the pusher rod bodies, the front and rear legs and the connecting members are actuated so that the front legs, the rear legs and the connecting members are moved respectively toward each other while the front legs and the pusher rod bodies are caused to approach the rear legs.

In a preferred embodiment of the invention, the operatively connecting means comprising a pair of longitudinally extending connecting rods which pivotally connect a pair of front legs to a pair of rear legs and which, by their rear portions, pivotally connect a pair of pusher rod bodies each at a point spaced a predetermined distance from its lower end. Besides such support leg pusher rod connecting rods, the present carriage includes foldable connecting rods for regulating the transverse spacing between the front legs and between the rear legs. Further, the operatively connecting means includes link means which perform the following function during the folding operation: When the pusher rod support angle bars are substantially downwardly turned owing to the downward displacement of the pusher rod bodies while the support leg pusher rod connecting rods are actuated for substantial alignment with the rear legs, said link means acts to draw the front legs toward the rear legs and folds or bends the connecting rods for the front and rear legs. The link means comprises connecting rod turning members each axially slidably fitted on the associated front leg in the central portion of the latter, bar links each connected between the associated connecting rod turning member and the front end portion of the associated support leg pusher rod connecting rod, and pivotally supported arms each extending inwardly of the associated front leg. Further, the link means includes folding operative connecting rods each connected between the associated pusher rod support angle bar and the associated front leg.

Further, in a preferred embodiment of the invention, the baby carriage includes a hammock having a reclinable back rest. Preferably, the hammock is provided with a head guard designed to act in operative connection with the back rest so as to develop its inherent function only when required to.

In a referred embodiment, the baby carriage has a basket attached thereto which is adapted to be folded in operative association with the folding of the baby carriage.

Accordingly, a principle object of the present invention is to provide a baby carriage which, when folded, has a greately reduced height, width and longitudinal dimension, presenting a minimum of bulk.

Another object of the invention is to provide a baby carriage designed so that when it is folded, the four wheels, front and rear, are on a level with each other, thus allowing the baby carriage to stand itself in its folded state.

A further object of the invention is to provide a baby carriage which is easy to fold and unfold, such that the folding and unfolding operation can be carried out by one hand.

Still a further object of the invention is to provide a baby carriage which may be pulled in its folded state during walking by making use of the rolling of the wheels.

Another object of the invention is to provide a baby carriage having a reduced weight so that it will not become a burden for conveyance in its folded state.

Another object of the invention is to provide a baby carriage which is convenient for use.

These objects and other objects and features will become more apparent from the following detailed description when taken in conjunction with the accompanying drawings.

DESCRIPTION OF THE PREFERRED EMBODIMENTS

An embodiment of the invention will now be described in detail with reference to the accompanying drawings. The outlines of such embodiment will first be described with reference to FIGS. 1 and 3 for a better understanding, rather than going into detail at the outset.

Figure 1:
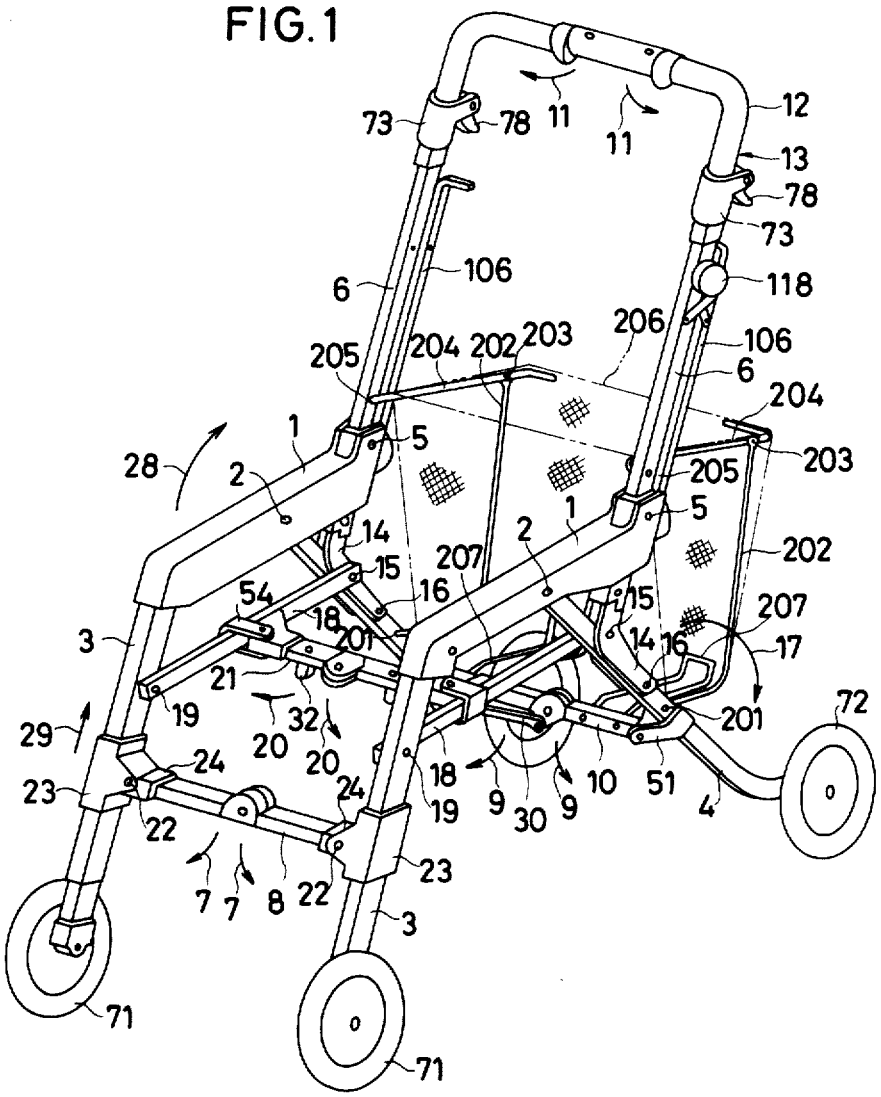
FIG. 1 is a perspective view of a baby carriage in its opened state embodying the present invention.
Figure 2:
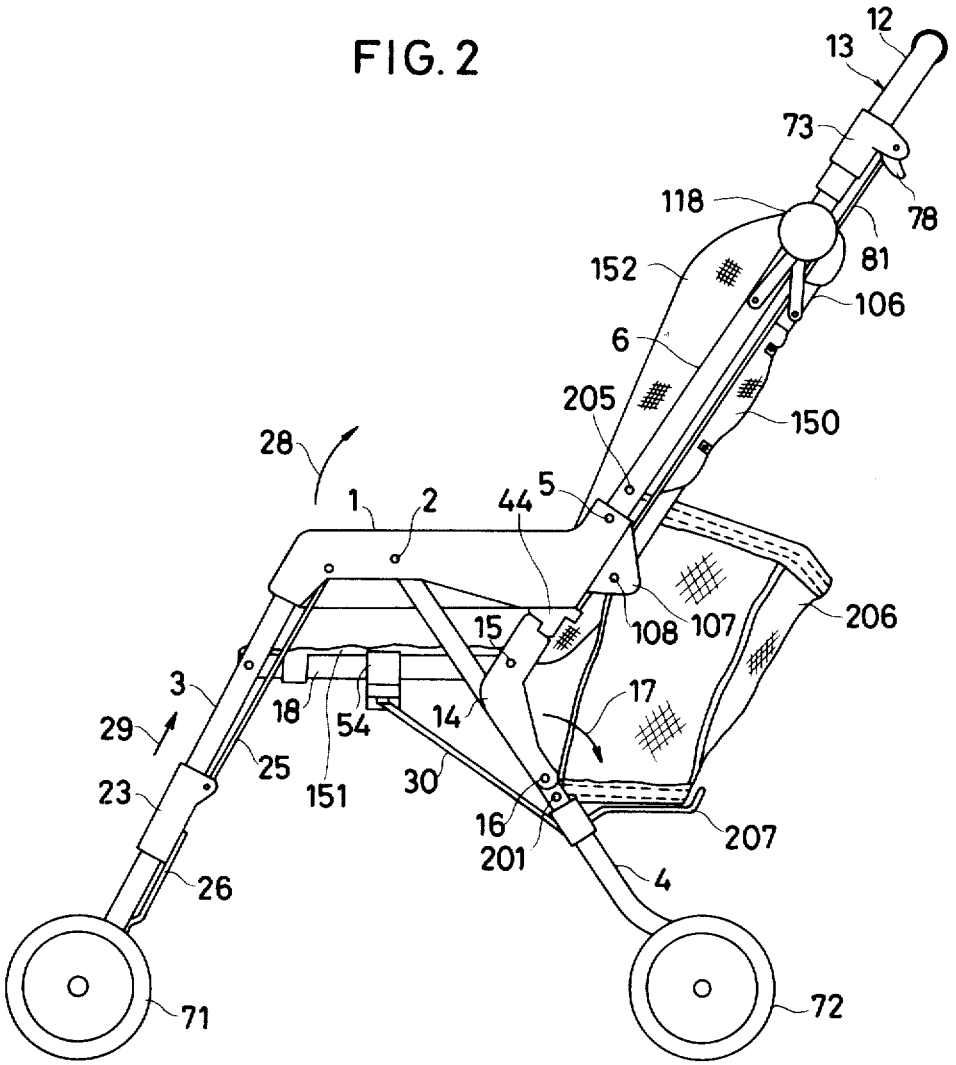
FIG. 2 is a right-hand side view of the baby carriage of FIG. 1.
Figure 3:
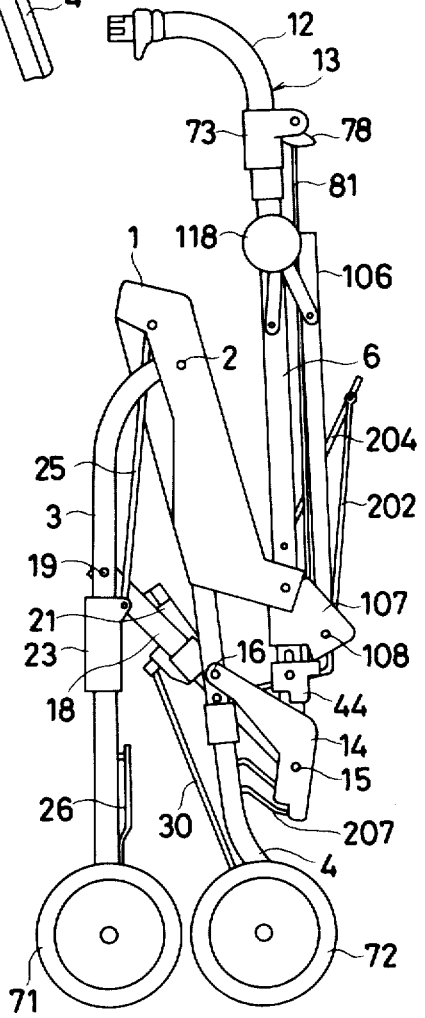
FIG. 3 is a right-hand side view of the baby carriage of FIG. 1 in its closed state.

FIG. 1 is a perspective view of a baby carriage in its opened state embodying the present invention; FIG. 2 is a right hand side view of the same; and FIG. 3 is a right-hand side view of said baby carriage in its closed state. Basically, the baby carriage of the invention comprises a pair of support leg pusher rod connecting rods 1, a pair of front legs 3 and a pair of rear legs 4 which are pivotally supported on support leg pivot pins 2 in relatively forward or intermediate regions of said support leg pusher rod connecting rods, a pair of pusher rod bodies 6 pivotally supported on pusher rod pivot pins 5 disposed on the rear ends of the support leg pusher rod connecting rods 1 at a predetermined distance from the lower end, a front leg connecting rod 8 which is foldable only downardly (as indicated by arrows 7) for connecting said pair of front legs 3, a rear leg connecting rod 10 which is foldable only downwardly (as indicated by arrows 9) for connecting said pair of rear legs 4, and a pusher rod connecting member 12 which is foldable only forwardly (as indicated by arrows 11) for connecting said pair of pusher rod bodies 6. The pusher rod bodies 6 and pusher rod connecting member 12 constitute a pusher rod 13.

According to the invention, in such basic construction, the lower ends of the pusher rod bodies 6 and the rear legs 4 are foldably connected together by pusher rod supoprt angle bars 14 through pivot pins 15 and 16, so that depending upon whether the pusher rod support angle bars 14 are turned to extend along the upper halves of the rear legs 4 (FIGS. 1 and 2) or the lower halves of the rear legs 4 in the direction of arrow 17 (FIG. 3), the lower ends of the pusher rod bodies 6 will be positioned either upwardly or downwardly relative to the rear legs 4. When the lower ends of the pusher rod bodies 6 are positioned upwardly relative to the rear legs 4, the support leg pusher rod connecting rods 1, the lower portions of the pusher rod bodies 6 and the upper portions of the rear legs 4 define triangles to thereby establish the opened condition of the baby carriage. The shape and construction of the related members are so selected that when the lower ends of the pusher rod bodies 6 are positioned downwardly relative to the rear legs 4, the support leg pusher rod connecting rods 1, pusher rod bodies 6 and rear legs 4 are substantially parallel to each other, thereby establishing the folded condition of the baby carriage.

A folding operative connecting rod 18 is installed between the associated pusher rod support angle bar 14 and front leg 3 and pivotally connected thereto at its opposite ends by pivot pins 15 and 19. Connected between the pair of folding operative connecting rods 18 is a central connecting rod 21 which is foldable only forwardly (as indicated by arrows 20).

The basic construction of the foldable chair type baby carriage has thus been completed.

The various parts will now be described in detail.

Figure 4:
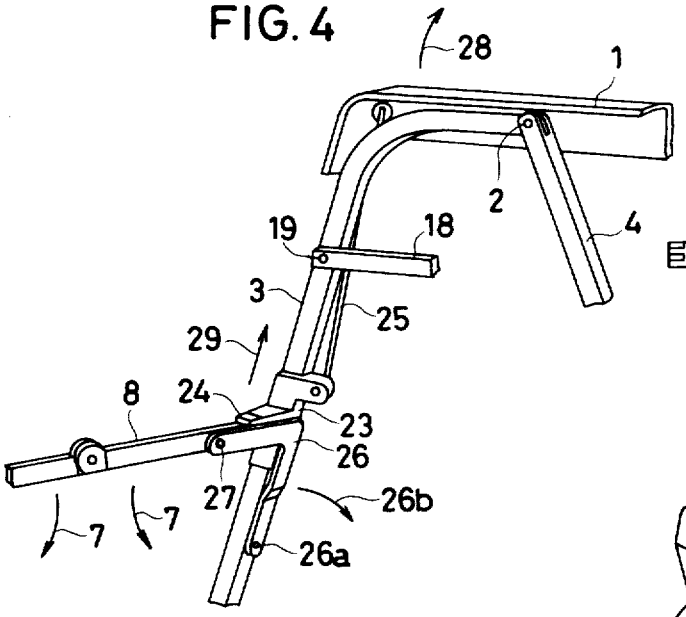
FIG. 4 is a perspective view, as seen from the rear, of the operatively connected portions of a support leg pusher rod connecting rod 1, a front leg 3 and a front leg connecting rod 8 shown in FIGS. 1 and 2.
Figure 5:
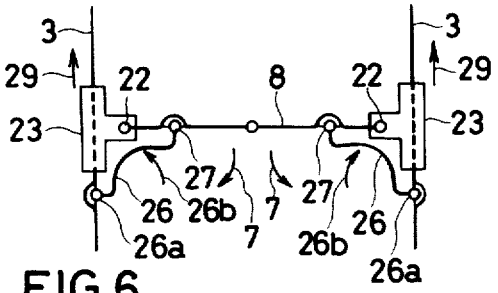
FIGS. 5 and 6 are diagrammatic views for explanation of the movement of the portions shown in FIG. 4.
Figure 6:
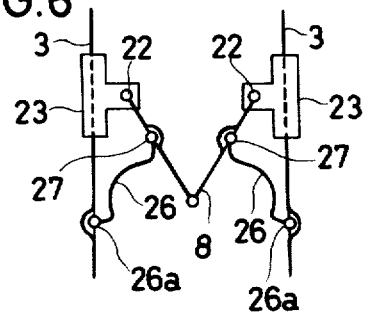

FIG. 4 is a perspective view of the operatively connected portions of the front leg pusher rod connecting rod 1, front leg 3 and front leg connecting rod 8, as seen from rear. FIGS. 5 and 6 are diagrammatic views for explanation of the movements of the components shown in FIG. 4. Referring to FIGS. 1 through 6, the front leg connecting rod 8 is pivotally connected at its ends to connecting rod turning members 23 by pivot pins 22. Each connecting rod turning member 23 is provided with a socket portion 24 of inverted U-shaped cross-section placed on top of an end portion of the front leg connecting rod 8 to cover said end portion. The connecting rod turning member 23 is axially slidably fitted on the associated front leg 3 in the middle region thereof. A bar link 25 is connected between the connecting rod turning member 23 and the front end of the support leg connecting rod 1. An L-shaped arm 26 extends inwardly from the front leg 3 and pivotally connected thereto by a pivot pin 26a. The front leg connecting rod 8 is pivotally supported on pivot pins 27 each carried at the front end of the associated arm 26 and positioned at a predetermined distance from the associated end of the front leg connecting rod 8.

In the arrangement described above with reference to FIG. 4 and other figures, if the support leg pusher rod connecting rod 1 is turned around the axis of the pivot pin 2 in the direction of arrow 28, the connecting rod turning member 23 is slid on the front leg 3 in the direction of arrow 29. In response thereto, the arm 26 is turned in the directiobn of arrow 26b, while the front leg connecting rod 8 is turned around the axes of the pivot pins 27 in the direction of arrows 7 and is thereby downwardly folded (FIG. 6).

The reverse movement of the front leg connecting rod 8 of FIG. 6 from its folded position is effected by the turning of the support leg pusher rod connecting rod 1 in the opposite direction to cause the bar link 25 to depress the connecting rod turning member 23. Thus, the force exerted by this movement acts to turn the front leg connecting rod 8 from the FIG. 6 condition to straighten the same while turning the arm 26 downwardly, thereby establishing the FIG. 5 condition.

When the front leg connecting rod 8 is in straightened condition as shown in FIG. 5 and other figures, that is, when the baby carriage is in opened condition, the application of a downward force on the front leg pusher rod connecting rod 1 (which force is produced, for example, by the weight of a baby placed on a hammock attached to the front leg pusher rod connecting rods 1) causes the bar link 25 to force the connecting rod turning member 23 downwardly (in the direction opposite to the direction of arrow 29), resulting in downwardly forcing the end portion of the front leg connecting rod 8 received in the socket portion of the connecting rod turning member 23, thus forcing the front leg connecting rod 8 to fold upwardly, which means inhibiting the front leg connecting rod 8 from turning in the direction of arrows 7. That is, the greater the amount of load applied, the more firmly the baby carriage is maintained in opened condition.

Figure 7:
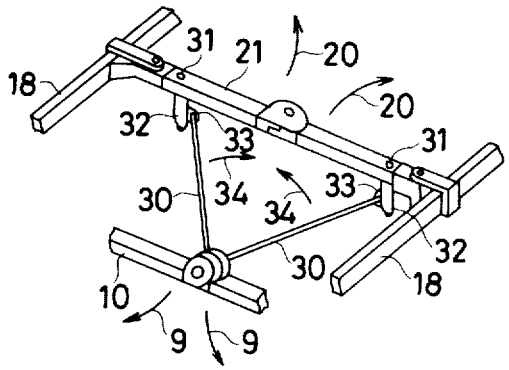
FIG. 7 is a perspective view, as seen from the rear, of the operatively connected portions of a rear leg connecting rod 10 and a central connecting rod 21 shown in FIGS. 1 and 2.
Figure 9:
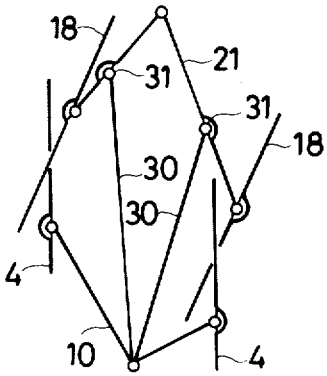
FIGS. 8 and 9 are perspective diagrammatic views for explanation of the movement of the portions shown in FIG. 7.
Figure 8:
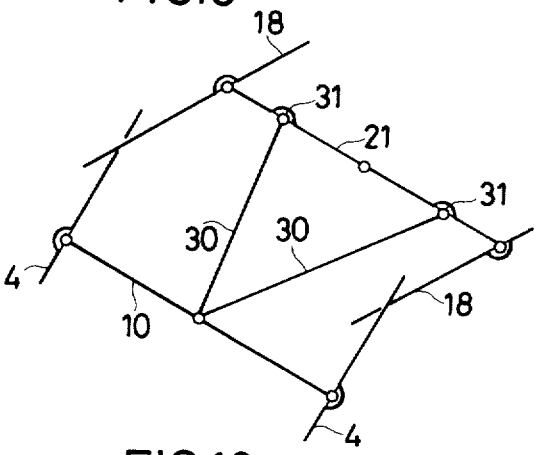

FIG. 7 is a perspective view of the operatively connected portions of the rear leg connecting rod 10 and central connecting rod 21, as seen from rear. FIGS. 8 and 9 are perspective diagrammatic views for explanation of the movement of the portion shown in FIG. 7; and FIG. 10 is a diagrammatic view, as seen from one side, showing the positional relation between a folding operative connecting rod 18, central connecting rod 21 and tie rods 30 shown in FIG. 9.

Figure 10:
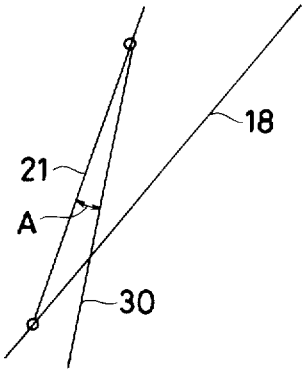
FIG. 10 is a diagrammatic view, as seen from one side, showing the positional relation between a folding operative connecting rod 18, central connecting rod 21 and tie rods 30 shown in FIG. 9.

Referring to FIGS. 1 through 2 and 7 through 10, the central connecting rod 21 is disposed at a level different from that of the rear leg connecting rod 10. The selected manner of folding of the central connecting rod 21 in the direction of arrows 20 is, preferably, not such that it is folded in a plane containing the pair of folding operative connecting rods 18 but such that the folding takes place in a direction somewhat upward relative to the plane containing the folding operative connecting rods 18. This manner is best shown in FIGS. 3, 9 and 10. In order that the folding of the control connecting rod 21 in the direction of arrows 20 may be operatively associated with the folding of the rear leg connecting rod 10 in the direction of arrows 9, a pair of tie rods 30 are provided. The tie rods 30 have one of their respective ends connected to the folding section of the rear leg connecting rod 10 and the other ends connected to the central connecting rod 21 on opposite sides of the folding section of the latter and at predetermined distances from said folding section. The central connecting rod 21 is provided with tongues 33 each extending laterally of a rotatable sleeve 32. Thus, the tie rods 30 are connected at their one end to the tongues 33.

The arrangement described above with reference to FIG. 7 and other figures is such that the rear leg connecting rod 10 and the central connecting rod 21 move toward each other, while the folding of the rear leg connecting rod 10 in the direction of arrows 9 (downwardly) takes place and under the action of other related members the pair of folding operative connecting rods 18 move toward each other, so that the pair of tie rods 30, while each turning in the direction of arrow 34, cause the central connecting rod 21 to fold in the direction of arrows 20 (forwardly).

What should be noted here is the related movement of the rear leg connecting rod 10, central connecting rod 21 and tie rods 30. That is, when the rear leg connecting rod 10 and the central connecting rod 21 move toward each other, it will be understood that the rear leg connecting rod 10 and the central connecting rod 21 are folded outwardly, namely, in the directions of arrows 9 and 20, respectively, simply by the propping action of the tie rods 30. However, another noticeable movement is taking place. That is, in response to the folding of the central connecting rod 21, in the direction of arrows 20, the pair of shafts 31, sleeves 32 and tongues 33, respectively, move toward each other. This results in the turning of the tie rods 30 each in the direction of arrow 34. This turning of the tie rods 30 means increasing the end-to-end distance defined by the pair of tie rods 30. If the tie rods 30 were arranged not in a V-form but parallel to each other, the connecting rods 10 and 21 could be folded only to the extent which corresponds to the amount of relative movement of the rear leg connecting rod 10 and central connecting rod 21 toward each other. In contrast, the V-form arrangement of the tie rods 30 as shown in FIG. 7 and other figures allows the folding of the connecting rods 10 and 21 to the extent which corresponds to the amount of relative movement of the rear leg connecting rod 10 and central connecting rod 21 toward each other plus the amount of rotation of the tie rods 30 each in the direction of arrow 34. Thus, this arrangement provides an increased degree of folding of the rear leg connecting rod 10 and central connecting rod 21, which means that the width of the foldable baby carriage in folded condition can be decreased. Further, what should be noted here is that the mechanism for performing the operation described above is very simple.

The reverse operation is likewise carried out in the interlocking relation which is established by the tie rods 30.

Further, as described above, the intention of the arrangement wherein the folding direction of the central connecting rod 21 is so selected as to face somewhat upward from the plane containing the folding operative connecting rods 18 is to assure that during the folding movement of the rear leg connecting rod 10 and central connecting rod 21 there will be a time, at least for an instant, when the plane containing the central connecting rod 21 in its folded state coincides with or crosses the plane containing the pair of tie rods 30 at a very small angle A (FIG. 10). This coincidence in direction means that the plane in which the tie rods 30 act coincides with the plane in which the central connecting rod 21 is folded, providing efficient transmission of the forces exerted by the tie rods 30 to the central connecting rod 21.

In this embodiment, the described time of directional coincidence is almost realized when the central connecting rod 21 is close to its maximum folded condition. That is, said coincidence takes place when the folding of the baby carriage is almost completed. This is related to the folding operation on the baby carriage to be later described and is designed by taking into account the fact that in the initial stage of the operation of bringing the baby carriage from its closed to its opened condition and in the final stage of the operation of bringing the baby carriage from its opened to its closed condition, the operator will feel a difficulty in exerting a greater force or a greater force will be needed. More particularly, this foldable baby carriage can be closed by downwardly urging the pusher rod 13 toward the ground in such a manner as to turn the pusher rod support angle bars 14 in the direction of arrows 17 (FIGS. 1 and 2), but when it is to be opened, the pusher rod 13 is raised to utilize the weight of the baby carriage for allowing the unfolding operation to proceed. In this case, there is a limit to the weight of the baby carriage, and rather, the baby carriage is constructed preferably lightweight. Therefore, so great a force cannot be applied in the folding operation. Therefore, in the initial stage of the change from closes to opened condition, as shown in FIGS. 3 and 9, if the direction of action of the tie rods almost coincides with the direction of folding of the central connecting rod 21, it will be understood that the central connecting rod 21 can be turned with a small amount of force. Further, in the final stage of the change from opened to closed condition, attainment of the properly disposed condition of the parts shown in FIG. 3 will need a relatively large amount of force. In this case, also, it will be understood that the arrangement represented by this embodiment is very advantageous.

Figure 11:
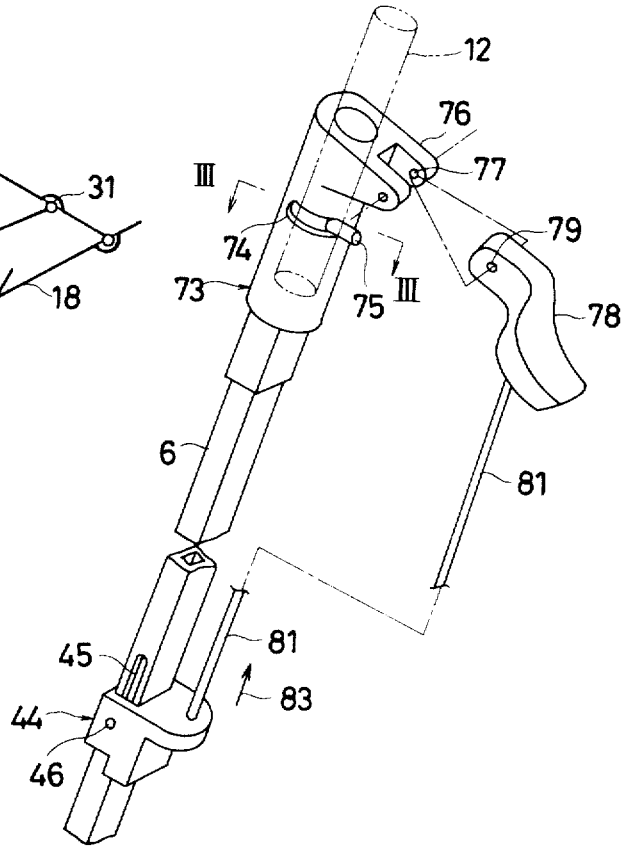
FIG. 11 is a view for explaining an example of an operating means installed in connection with a pusher rod 13 of FIGS. 1 and 2, with part of an arrangement associated with an operating lever being shown in exploded perspective view.
Figure 12:
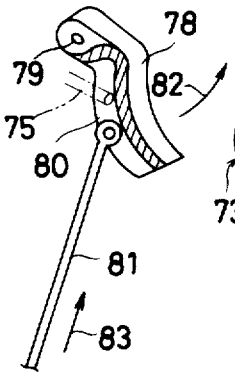
FIG. 12 is a fragmentary perspective view of the operating lever of FIG. 11.
Figure 13:
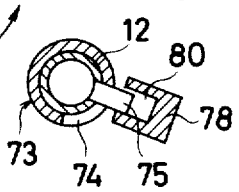
FIG. 13 is a section taken along the line III—III of FIG. 11.
Figure 14:
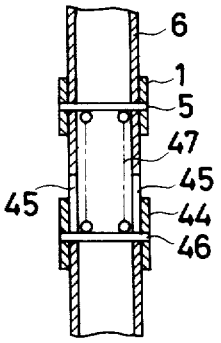
FIG. 14 is a longitudinal section of an arrangement associated with the sleeve 44 of FIG. 11.

FIGS. 11 through 14 are views for explanation of one example of operating means associated with the pusher rod 13. FIG. 11 is a partly exploded perspective view of an arrangement around an operating lever; FIG. 12 is a fragmentary perspective view of the operating lever;

FIG. 13 is a sectional view taken along the line III—III of FIG. 11; and FIG. 14 is a longitudinal section of an arrangement around a sleeve. The upper end of each pusher rod body 6 is formed with a guide socket 73. The latter receives an end of the pusher rod connecting member 12. The pusher rod connecting member 12 is formed of a round pipe or bar and is turnable within the guide socket 73 around the axis of the latter. The lateral surface of the guide socket 73 is formed with an elongated guide opening 74 extending through about 90 degrees for receiving a guide pin 75 which is fixed to the pusher rod connecting member 12. The guide socket 73 is formed with a bracket 76 having throughgoing holes 77 formed therein. An operating lever 78 has a throughgoing hole 79. With the throughgoing holes 79 and 77 aligned with each other, a shaft (not shown) is inserted into said holes, so that the guide lever 78 is turnably supported in the guide socket 73. The operating lever 78 has a recess 80 therein on its downwardly directed surface. The portion where said recess 80 is formed has the upper end of a rod 81 attached thereto, the lower end of said rod 81 being attached to a sleeve 44.

The sleeve 44 is slidably fitted on the lower portion of the pusher rod body 6. Adjacent the sleeve 44, the pusher rod body 6 is formed with an elongated opening 45 and a pin which extends through said elongated opening 45 is fixed to the sleeve 44. The cooperative action of the elongated opening 45 and pin 46 defines the range of slide movement of the sleeve 44. A spring 47 is installed inside the tubular pusher rod body 6 and between the pins 5 and 46 downwardly elastically urges the sleeve 44 at all times. As a result, the lower end surface of the sleeve is urged into engagement with the end of the pusher rod support angle bar 14 to secure the opened condition of the baby carriage (FIGS. 1 and 2).

The operating lever 78 has the dual function of releasing the sleeve 44 from the pusher support angle bar 14 and keeping the pusher rod connecting member 12 from turning relative to the pusher rod body 6. Thus, if the operating lever 78 is turned downwardly, the guide pin 75 is received in the recess 80 (FIGS. 12 and 13), thereby inhibiting the pusher rod connecting member 12 from turning relative to the guide socket 73. If the operating lever 78 is turned in the direction of arrow 82, the rod 81 is displaced in the direction of arrow 83, releasing the sleeve 44 from the pusher rod support angle bar 14, while the guide pin 75 comes out of the recess 80, enabling the pusher rod operative connecting member 12 to turn. Thereupon, the operating lever 78 is upwardly turned beyond the dead point and becomes stabilized.

The turning of the operating lever 78 in the direction of arrow 82 triggers a folding operation on the baby carriage to be later described. The downward turning of the operating lever 78 (which is finally urged by the spring 47) is effected when the opened condition of the baby carriage is fixed.

Figure 15:
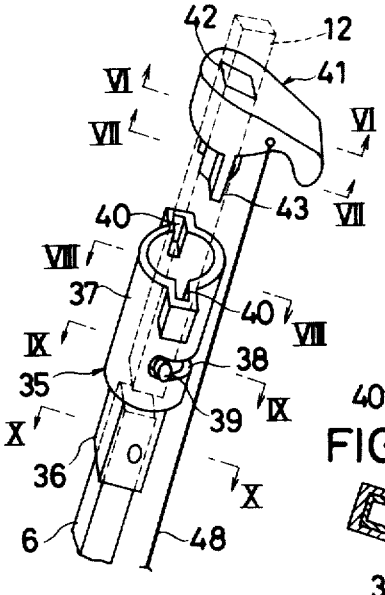
FIG. 15 is a perspective view of an operating bar and its surroundings, illustrating another example of operating means installed in connection with the pusher rod 13 of FIGS. 1 and 2.
Figure 16:
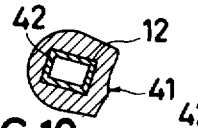
FIG. 16 is a section taken along the line VI—VI of FIG. 15.
Figure 17:
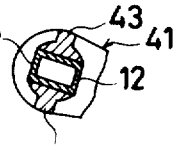
FIG. 17 is a section taken along the line VII—VII of FIG. 15.
Figure 18:
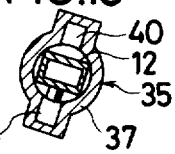
FIG. 18 is a section taken along the line VIII—VIII of FIG. 15.
Figure 19:
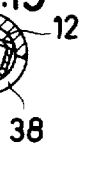
FIG. 19 is a section taken along the line IX—IX of FIG. 15.
Figure 20:
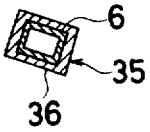
FIG. 20 is a section taken along the X—X of FIG. 15.
Figure 21:
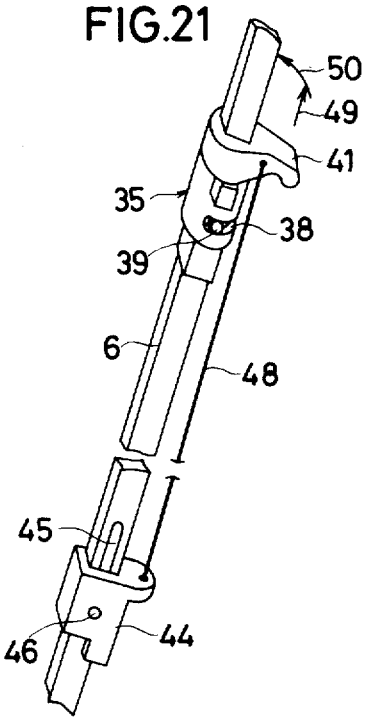
FIG. 21 is a perspective view of an arrangement extending from the operating bar 41 to the sleeve 44 of FIG. 15.

FIGS. 15 through 21 are views for explanation of another example of operating means installed in connection with the pusher rod 13. FIG. 15 is a perspective view of an operating bar and its surroundings; FIG. 16 is a section taken along the line VI—VI of FIG. 15; FIG. 17 is a section taken along the line VII—VII of FIG. 15; FIG. 18 is a section taken along the line VIII—VIII of FIG. 15; FIG. 19 is a section taken along the line IX—IX of FIG. 15; FIG. 20 is a section taken along the line X—X of FIG. 15; and FIG. 21 is a perspective view of an arrangement extending from the operating bar to a sleeve. Referring to FIGS. 15 through 21, the upper end of each pusher rod body 6 is formed with a guide socket 35. The pusher rod body 6 is formed of a square pipe or bar and inserted at its upper end into the square sleeve portion 36 of the guide socket 35. The upper portion of the guide socket 35 forms a cylindrical portion 37, which receives one end of the pusher rod connecting member 12. The portion received in the cylindrical portion 37 is the portion which is axially aligned with the pusher rod body 6. The pusher rod connecting member 12, like the pusher rod body 6, is formed of a square pipe or bar, but when it is received in the cylindrical portion 37, its turning around the axis of the cylindrical portion is permitted. The lateral surface of the cylindrical portion 37 is formed with an elongated guide opening 38 extending through about 90° for receiving a guide pin 39 fixed to and extending from the side of the pusher rod connecting member 12. Therefore, the pusher rod connecting member 12 is turnable within the range defined by the length of the elongated guide opening 38. The upper surface of the guide socket 35 is formed with laterally projecting grooves 40.

A square-apertured operating bar 41 is disposed coaxially with the pusher rod body 6 and above the guide socket 35. The square-apertured operating bar 41 is formed with a square throughgoing aperture 42, in which the pusher rod connecting member 12 is inserted, thereby allowing the square-apertured operating bar 41 to axially slide along the pusher rod connecting member 12 while inhibiting it to turn relative to the latter. The square-apertured operating bar 41 is formed with downwardly extending projections 43 adapted to fit in the grooves 40 for sliding along the pusher rod connecting member 12. This fitting, when effected, inhibits the pusher rod connecting member 12 from turning relative to the pusher body 6. This means that the turning movement in the direction of arrow 11 in FIG. 1 is inhibited.

A wire 48 is installed between the square-apertured operating bar 41 and the sleeve 44 (see FIGS. 11 and 14) to establish an interlocking relation therebetween. The interlocking through this wire 48 will now be described. The state shown in FIG. 21 corresponds to that shown in FIGS. 1 and 2. If the square-apertured operating bar 41 is pulled up in the direction of arrow 49 as seen in FIG. 21, the sleeve 44 is upwardly moved by the wire 48. In response thereto, the lower surface of the sleeve 44 leaves the end of the pusher rod support angle bar 14, thus establishing a state which allows the turning of the pusher rod support angle bar 14 in the direction of arrow 17, which will induce the folding of the baby carriage. The resulting positional relation between the square-apertured opening bar 41 and the guide socket 35 is such that, as shown in FIG. 15, the projections 43 are disengaged from the grooves 40. While maintaining this state, for example, by slightly twisting the square-apertured operating bar 41 in the direction of arrow 50 to place the lower end surface of the projections 43 on the upper end surface of the guide socket 35, the square-apertured operating bar 41 is then turned around the axis of the pusher rod body 6 in the direction of arrow 50, whereby the pusher rod connecting member 12 is turned relative to the guide socket 35 to cause collapsing in the direction of arrow 11 in FIG. 1. This operation also induces the folding of the baby carriage.

If the square-apertured operating bar 41 is reversely operated, the square-apertured operating bar 41 being downwardly urged by the sleeve 44, which is loaded by the spring 47, through the wire 48 assures that when the projections 43 are aligned with the grooves 40, engagement between them is automatically effected and that engagement between the lower end surface of the sleeve 44 and the end of the support angle bar 41 is effected.

Figure 22:
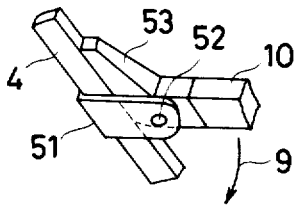
FIG. 22 is a perspective view of the pivot portion of the rear leg connecting rod 10 where it is pivotally connected to the rear leg 4.
Figure 23:
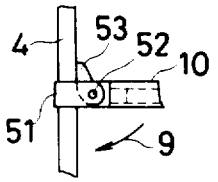
FIG. 23 is a front view of the pivot portion of FIG. 22.

FIG. 22 is a perspective view showing a pivot portion for the rear leg connecting rod 10 relative to the rear leg 4; and FIG. 23 is a front view of said portion. The rear leg connecting rod 10 is pivotally connected to the rear leg 4 by a pivot pin 52 mounted in a U-shaped connector 51 fixed to the rear leg 4. Each end of the rear leg connecting rod 10 is formed with a rotation stop 53 including a surface which is normal to the direction in which the rear leg connecting rod 10 extends, thereby rendering the rear leg connecting rod 10 collapsible only in the direction of arrows 9, as already described.

Figure 24:
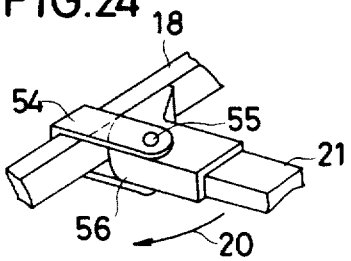
FIG. 24 is a perspective view of the pivot portion of the central connecting rod 21 where it is pivotally connected to the folding operative connecting rod 18 of FIGS. 1 and 2.
Figure 25:
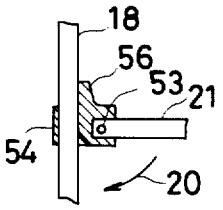
FIG. 25 is a fragmentary view showing the pivot portion of FIG. 24.

FIG. 24 is a perspective view showing a pivot portion for the central connecting rod 21 relative to the folding operative connecting rod 18, and FIG. 25 is a plan view, partly in section, of said pivot portion. The pivot portion shown in these figures has substantially the same operating principle as the pivot portion shown in FIGS. 22 and 23. Thus, the central connecting rod 21 is pivotally connected to the folding operative connecting rod 18 by a pivot pin 55 mounted in a connector 54 fixed to said rod 18 and has a rotation stop 56 formed on the end thereof which allows the central connecting rod 21 to turn only in the direction of arrows 20.

The arrangement of the baby carriage according to an embodiment of the invention directly related to folding operation has so far been described in detail.

Referring to FIGS. 1 and 2, which shows the opened condition of the baby carriage, the pusher rod support angle bars 14 are turned to follow the upper halves of the rear legs 4, with the result that the lower, remaining portions of the pusher rod bodies 6 are positioned relatively upwardly of the rear legs 4. At this time, a triangle is defined by the support leg pusher rod connecting rod 1, the lower portion of the pusher rod body 6 and the upper portion of the rear legs 4, whereby the opened condition of the baby carriage is established.

The folding operation on the baby carriage proceeding from the FIGS. 1 and 2 condition to the FIG. 3 condition will now be described. First, the operating lever 78 is turned in the direction of arrow 82 (FIG. 12) until it is brought to an upwardly inverted condition. In this condition, since the operating lever has passed the dead point, it is maintained in its position even if urged by the spring 47. At this time, the guide pin 75 has come out of the recess 80 to render the pusher rod connecting member 12 turnable. Further, the pressure engagement between the sleeve 44 and the pusher rod support angle bar 14 has been canceled. The operation described so far can be performed by successively manipulating the two operating levers 78 by one hand. Next, one side of the central foldable portion of the pusher rod connecting member 12 is gripped by one hand and the pusher rod 13 is tilted slightly forward while applying a twisting force thereto in the direction of arrows 11, so as to cause the pusher rod support angle bars 14 to turn a little in the direction of arrow 17. Thereafter, the pusher rod 13 is downwardly thrusted by the hand which has grasped the pusher rod connecting member 12. When this thrusting operation is performed, at least the rear wheels 72 are engaged with the ground.

In addition, there are cases where the twisting force in the direction of arrows 11 acting on the pusher rod connecting member 12 and the starting torque in the direction of arrow 17 acting on the pusher rod support angle bars 14, described above, are naturally produced by the weight of the baby carriage. More particularly, if the operator grips the pusher rod connecting member 12 on one side of its central foldable portion by one hand and tilts the entire baby carriage rearwardly such that the front wheels 71 float in the air with the rear wheels 72 kept in contact with the ground, the weight of the baby carriage acts to cause the other side of the pusher rod connecting member 12 to sag through the intermediary or the central foldable portion. Thus a twisting force in the direction of arrows 11 acting on the pusher rod connecting member 12 is produced. Further, the pusher rod support angle bars 14 and the pusher rod bodies 6 are downwardly collapsed under the force of gravity. Thus, a force is produced which acts on each pusher rod support angle bar 14 to turn the latter in the direction of arrows 17. After the folding of the pusher rod connecting member 12 and the turning of the pusher rod support angle bars 14 are effected to some degree under these two types of forces, the operator brings the baby carriage back to its original position and depresses the pusher rod 13 by the hand which grasps the pusher rod connecting member 12. As a result, the following operation is subsequently effected.

The pusher rod support angle bars 14 are further turned in the direction of arrows 17 until they extend along the lower halves of the rear legs 4. In response thereto, the support leg pusher rod connecting rods 1 are turned substantially around the axes of the support leg pivot pins 2 in the direction of arrow 28, causing the bar links 25 to slide the connecting rod turning members 23 in the direction of arrow 29. As a result, the front leg connecting rod 8 is folded in the direction of arrows 7. This folding of the front leg connecting rod 8 cooperates with the previously mentioned folding of the pusher rod connecting member 12 to decrease the width of the baby carriage. Therefore, concurrently therewith, the rear leg connecting rod 10 is folded in the direction of arrows 9, causing the tie rods 30 to fold the central connecting rod 21 in the direction of arrows 20. Further, in response to the turning of the pusher rod support angle bars 14 in the direction of arrow 17, the folding operative connecting rods 18 draw the front legs 3 toward the rear legs 4. These folding operations proceed substantially simultaneously, until the pusher rod support angle bars 14 are positioned to extend along the lower halves of the rear legs 4. At this time, the front and rear legs 3 and 4 are brought together to extend substantially parallel to each other, and the support leg pusher rod connecting rods 1 are turned in the direction of arrow 28 to be ready for receiving the rear legs 4 in the inner spaces of the support leg pusher rod connecting rods 1, with the support leg pusher rod connecting rods 1 and the rear legs 4 being brought to substantially parallel positions. Further, the front leg connecting rod 8, rear leg connecting rod 10, pusher rod connecting member 12 and central connecting rod 21 are fully folded, and the respective pairs of support leg pusher rod connecting rods 1, front legs 3, rear legs 4, pusher rod bodies 6, pusher rod connecting members 12 and folding operative connecting rods 18 move toward each other until they are close to each other, resulting in the baby carriage being also widthwise contracted. In this folded condition, the two front wheels 71 and two rear wheels 72 are all at the same level, thus enabling the baby carriage to stand by.

When it is desired to change the folded state shown in FIG. 3 into the unfolded state shown in FIG. 1, this can be attained basically by reversing the procedure described above, whereby the reversed operation takes place. In brief, the operator holds the pusher rod connecting member 12 by one hand and raises it to float the baby carriage in the air so as to cause the pusher rod bodies 6 to turn the pusher rod support angle bars 14 counterclockwise as seen in FIG. 3. In response thereto, the pusher rod support angle bars 14 are caused to extend along the upper halves of the rear legs 4, and the support leg pusher rod connecting rods 1 are turned counterclockwise, causing the bar links 25 and connecting rod turning elements 23 to straighten the front leg connecting rod 8. Further, the folding operative connecting rods 18 move the front legs 3 away from the rear legs 4. Because of the resulting increase in the widthwise dimension, the rear leg connecting rod 10 and central connecting rod 21 are straightened in interclocking relation by the action of the tie rods 30. When the condition shown in FIGS. 1 and 2 has been finally attained, the operating levers 78 are turned downwardly to receive the guide pins 75 in the recesses 80 therein, thereby inhibiting the folding of the folding operative connecting rod 12, while the sleeves 44 are brought into pressure engagement with the pusher rod support angle bars 14, so that the folding of the pusher rod support angle bars 14 and pusher rod 13 is inhibited, thereby establishing the firm, opened condition of the baby carriage.

Of FIGS. 1 through 3 showing the shape of the entire baby carriage, only FIG. 2 shows the shape of a hammock. The hammock comprises a back rest 150 retained by retaining rods 106, and a seat 151 formed on a plane defined by the folding operative connecting rods 18 and central connecting rod 21. In this case, the support leg pusher rod connecting rods 1 serve as arm rests. In addition, since flank plates 152 are vertically installed on opposite sides of the back rest 150 in FIG. 2, the back rest 150 does not clearly appear in FIG. 2. A reclining mechanism is incorporated in this hammock to permit changing the angle of inclination of the back rest 150. This will now be described.

Figure 26:
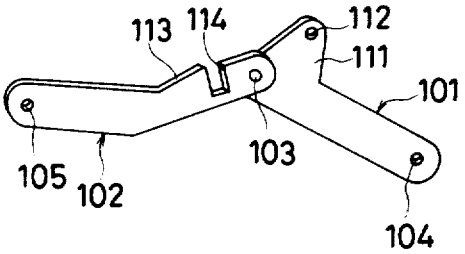
FIG. 26 is a perspective view of a first connecting rod and a second connecting rod, illustrating a reclining mechanism for a hammock.
Figure 28:
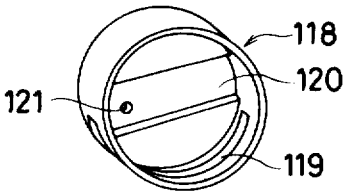
FIG. 28 is a perspective view showing a cover to receive the connecting portion for connecting rods.
Figure 27:
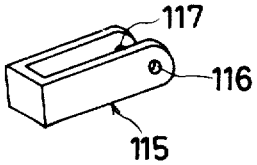
FIG. 27 is a perspective view of a locking member used in combination with the connecting portion of the connecting rod of FIG. 26.
Figure 29:
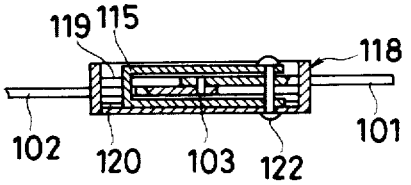
FIG. 29 is a section, showing the connecting portions of the first and second connecting rods.
Figure 30:
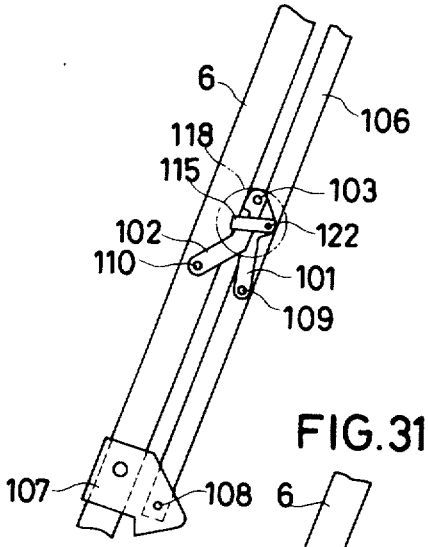
FIG. 30 is a side view showing a back rest retaining rod for retaining the back reset of a hammock, said rod being in its raised state.
Figure 32:
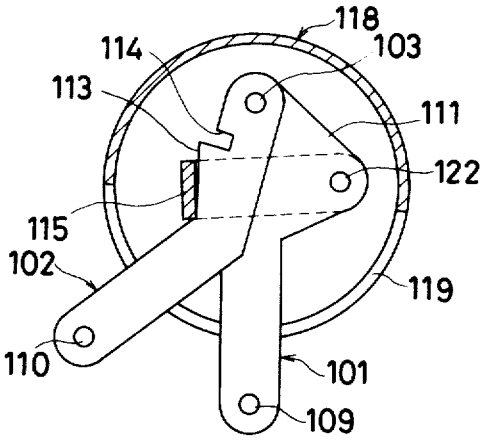
FIG. 32 is a diagrammatic side view of the principal portion of FIG. 30.
Figure 31:
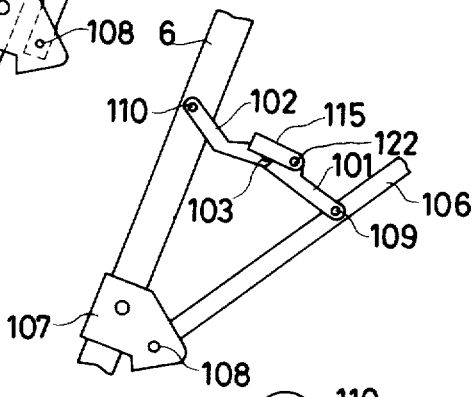
FIG. 31 is a side view showing said back rest retaining rod in its lowered state.
Figure 33:
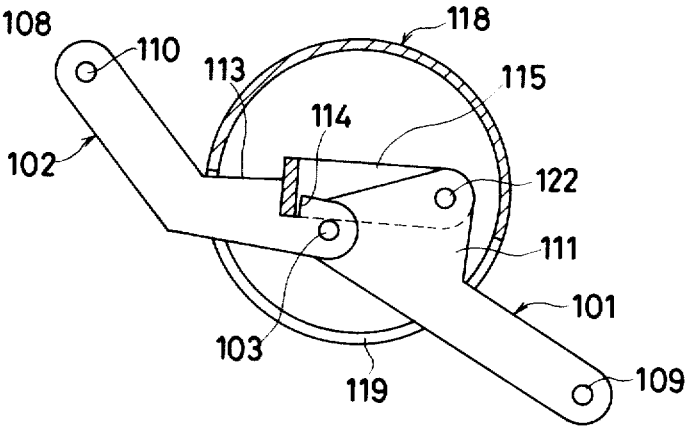
FIG. 33 is a diagrammatic side view of the principal portion of FIG. 31.

FIGS. 26 through 33 serve for explanation of a hammock reclining mechanism. FIG. 26 is a perspective view showing first and second connecting rods; FIG. 27 is a perspective view showing a locking member; FIG. 28 is a perspective view showing a cover; FIG. 29 is a sectional view showing a connecting portion for the first and second connecting rods; FIG. 30 is a side view showing a back rest holding rod for holding a hammock back rest (not shown), in raised condition; FIG. 31 is a side view showing the back rest holding rod in felled condition; FIG. 32 is a side view diagrammatically showing the principal portion of FIG. 30; and FIG. 33 is a side view diagrammatically showing the principal portion of FIG. 31.

Referring to FIG. 26, a first connecting rod 101 and a second connecting rod 102 are pivotally connected together by a pivot pin 103 so that they are foldable relative to each other. The respective ends of the first and second connecting rods 101 and 102 are provided with throughgoing holes 104 and 105, respectively. The first and second connecting rods 101 and 102, as shown in FIGS. 1 through 3, are connected between the pusher rod body 6 and a back rest holding rod 106.

The back rest holding rod 106 is installed between the opposed surfaces of a connector 107 of U-shaped cross-section fixed to the lower end of the pusher rod body 6 and is pivotally supported on a pivot pin 108. Holding the back rest holding rod 106 between the opposed surfaces of the connector 107 advantageously prevents the holding rod 106 from transversely shaking as said rod is turned.

The throughgoing holes 104 and 105 shown in FIG. 26 are used for connecting the first and second connecting rods 101 and 102 between the pusher rod body and the back rest holding rod 106. Thus, the first and second rods are pivotally supported by the back rest holding rod 106 and pusher rod body 6 through pivot pins 109 and 110 inserted in the throughgoing holes 104 and 105, respectively.

The first connecting rod 101 is formed with a projection 111 having a throughgoing hole 112. The second connecting rod 102 has a bent shape as a whole and is formed with first and second engaged portions 113 and 114. The first engaged portion 113 is simply a contour extending from the second engaged portion 102, but, in fact, it serves as such engaged portion, as will be understood from a description to be given later. The second engaged portion 114 is defined by a notch.

Referring to FIG. 27, a locking member 115 is formed in U-shape as a whole. It is provided with throughgoing holes 116 and 117 at its opposite ends.

Referring to FIG. 28, a cover 118 is formed in bottomed cylindrical shape as a whole. The lateral surface of the cover 118 is formed with a cutout 119 extending through about 180°. The bottom surface of the cover 118 is formed with a recess 120. A throughgoing hole 121 is formed in the recess 120 at a position biased to one side.

Referring to FIGS. 29 through 33, the manner of assembling said first and second connecting rods 101, 102, locking member 115 and cover 118 will now be described. The first step is to secure alignment between the throughgoing hole 112 in the first connecting rod 101, the throughgoing holes 116 and 117 in the locking member 115 and the throughgoing hole 121 in the cover 118. In addition, in this arranged condition, the cover 118 shown in FIG. 28 have been turned over from the illustrated position. In this arranged condition, a pivot pin 122 is inserted into the throughgoing holes 112, 116, 117 and 121. In this condition, one lateral surface of the locking member 115 fits in the recess 120 in the cover 118, so that the locking member 115 and cover 118 are allowed to turn in a unit. The first and second connecting rods 101 and 102 are led our through the cutout 119 in the cover 118.

By comparing FIGS. 30 and 32 with FIGS. 31 and 33, the operation of the reclining mechanism will now be described. In FIGS. 30 and 32, the first and second connecting rods 101 and 102 are in the first folded condition where they are folded to a maximum, with the locking member 115 engaging the engaged portion 113. In this condition, since the first and second connecting rods 101 and 102 are fixed by the locking member 115 so as not to open any further, the back rest holding rod 106 is fixed substantially parallel to the pusher rod body 6, i.e., with the back rest 150 of the hammock rising.

When it is desired to bring the back rest 150 of the hammock into felled condition from the above mentioned condition, the locking member 115 is turned clockwise to be disengaged from the first engaged portion 113. This operation may be performed by utilizing the cover 118 as a knob since if it is turned clockwise the locking member 115 is turned integrally therewith. With the locking member 115 disengaged, felling the back rest holding rod 106 will establish the second folded condition in which the first and second connecting rods 101 and 102 are straightened to the fullest extent. Even if the hand is then removed from the cover 118, the locking member 114 will be automatically engaged by the engaged portion 114. This is because since the cover 118 and locking member 115 are pivotally supported on the offset pivot pin 122, their forces of gravity tend to turn the same counterclockwise at all times. The manner of engagement between the locking member 115 and the second engaged portion 114 is shown in FIGS. 31 and 22.

In this condition, the back rest 150 of the hammock is in felled condition. When it is desired to bring the back rest 150 of the hammock into rising condition, the cover 118, serving as a knob, is turned clockwise to undo the engagement between the locking member 115 and engaged portion 114, turning the back rest holding rod 106 to raise the latter. In the final stage of this raising operation, as in the case of FIGS. 31 and 33, the forces of gravity of the locking member 115 and cover 118 produce counterclockwise turning for the locking member 115 to automatically engage the first engaged portion 113. Instead of utilizing gravitation, a spring may be used.

The first cover 118 has been described as being usable as a knob, but it goes without saying that the cover, in itself, provides safety by covering the connecting portions of the first and second connecting rods 101 and 102.

In the hammock having the above described reclining mechanism incorporated therein, greatly reclining the back rest 150 involves the danger of the baby in the hammock slipping headforemost out of the hammock if the entire baby carriage is rearwardly tilted with the front wheels 71 lifted as when the baby carriage being wheeled on a roadway comes to a sidewalk and gets on it. For this reason, it is desirable to provide a head guard on the upper end of the back rest 150 for covering the head of the baby.

Such head guard, however, is not required when the back rest 150 is in its raised position; it is even undesirable since it arouse a sense of oppression in the baby. Thus, a mechanism is desired which allows the head guard to extend at the upper end of the back reset in a direction which crosses the latter only when the back rest 150 is greatly reclined in response to the reclining action of the back rest. Such mechanism can be attained simply by adding a simple modification or a simple member to the reclining mechanism of the hammock described above. Such mechanism with a head guard will now be described.

Figure 34:
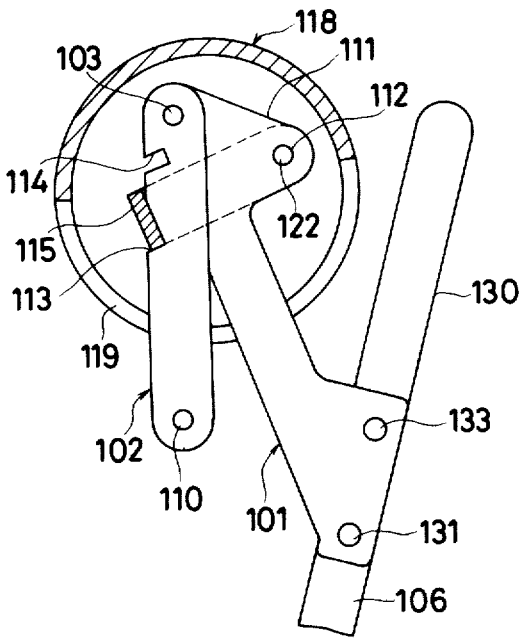
FIG. 34 is an enlarged diagrammatic side view of the principal portion of the back rest retaining rod in its raised position, illustrating a hammock having a head guard attached thereto.
Figure 36:
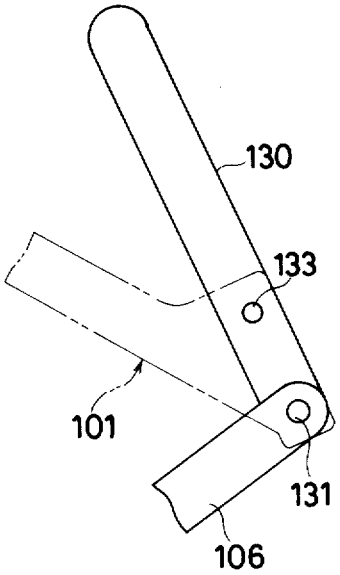
FIG. 36 is an enlarged diagrammatic perspective side view which supplements the explanation of the principal portion with reference to FIG. 35.
Figure 35:
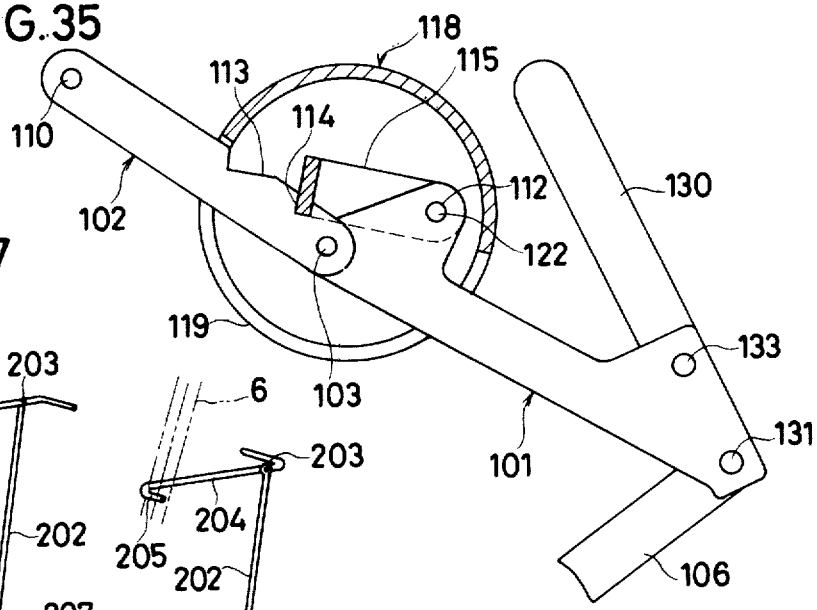
FIG. 35 is an enlarged diagrammatic side view of the principal portion of the back rest retaining rod of FIG. 34 in its lowered state.

FIGS. 34 through 36 are views for explanation of a hammock having a head guard added thereto. FIG. 34 is an enlarged diagrammatic side view, showing a back rest retaining rod in its raised position; FIG. 35 is an enlarged diagrammatic side view, showing the back rest retaining rod in its lowered position; and FIG. 36 is an enlarged diagrammatic side view which supplements the explanation of the principal portion with reference to FIG. 35.

A head guard retaining rod 130 is pivotally connected to the upper portion of a back rest retaining rod 106 by a pivot pin 131. This state is best shown in FIG. 36. The head guard retaining rod 130 is U-shaped as a whole, though not shown in FIGS. 34 through 36 which are side view, with foldable portions being formed at the opposite ends and at the middle of the horizontal portion of the U, the foldable portion at the middle being foldable in a direction indicated by the arrows 11 in FIG. 1. The purpose of this foldable arrangement is to allow the folding of the baby carriage. A first connecting rod 101 is fixedly connected to the head guard retaining rod 130 by a pivot pin 131 and a fixed pin 133. Although the head guard is not shown in FIGS. 34 through 36 and instead the head guard retaining rod 130 alone is shown therein, the head guard may be constructed as an extension of the back rest 150, and since its shape is not special, an illustration thereof is omitted.

With reference to FIGS. 34 and 35, the operation of the head guard retaining rod 130 will be described in connection with the tilting movement of the back rest retaining rods 106.

In the state shown in FIG. 34, the head guard retaining rod 130 is substantially aligned with the back rest retaining rod 106 as a result of the tilting of the first connecting rod 101. Accordingly, the head guard retained by the head guard retaining rod 130 extends in the same plane as that of the back rest and does not cover the head of the baby.

If the back rest retaining rod 106 in the state described above is lowered, the state shown in FIG. 35 is established. The first connecting rod 101 is now in its tilted state. In accordance with the tilted state of the first connecting rod 101, the head guard retaining rod 130 extends in a direction which crosses the back rest retaining rod 106. The head guard retained by the head guard retaining rod 130 now develops its inherent function as a head guard for protecting the baby on the back rest from slipping off headforemost.

Figure 37:
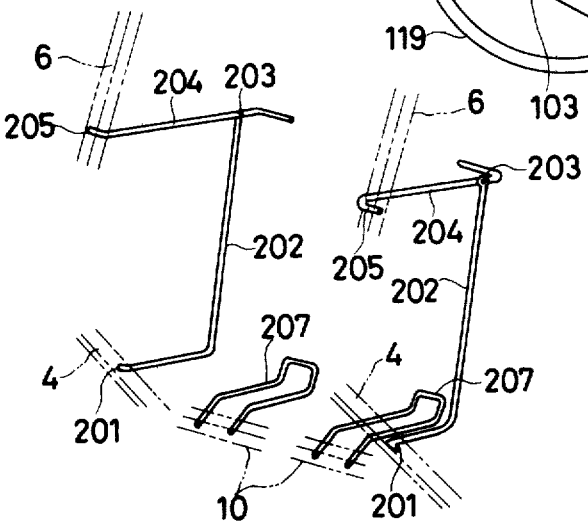
FIG. 37 is a diagrammatic perspective view of an arrangement connecting a basket extracted from FIG. 1.

As shown in FIGS. 1 through 3, the baby carriage has a basket attached thereto below the back rest for containing baggage. In addition, FIGS. 1 through 3 show only the framework of the basket. FIG. 37 is a diagrammatic perspective view of an arrangement concerning the basket.

With reference to FIGS. 1 through 3, and 37, the framework of the basket will now be described.

The framework of the basket is constructed, for example, by suitably bending metal bars of suitable diameter. Thus, a pair of L-shaped lateral rods 202 are pivotally supported at pivot points 201 in the rear leg 4 spaced a predetermined distance from the lower ends of the rear legs 4. Each L-shaped lateral rod 202 extends rearwardly from the pivot point 201 and then upwardly to pivot point 203 in upper side rods 204. Since there is no pivot in the bend of the L-shaped rods 202 as shown in FIG. 37, the spacing between the pivot points 201 and 203 must remain constant, whereby the pivotal movement is restricted. The upper side rod 204 extends longitudinally with its front end pivotally supported by the associated pusher rod body 6 at a pivot point 205. In addition, the pivot points 201 and 205 are provided by bending the L-shaped lateral rod 202 and the upper side rod 204, each at its one end, to form pivot shafts. The rear ends of the upper side rods 204 are inwardly bent in spaced relation to each other. This is an arrangement for allowing the folding of the baby carriage.

The basket 206 shown in FIG. 2 is attached to the L-shaped lateral rods 202 and upper side rods 204 which constitute a framework therefor. More particularly, the basket 206 is in the form of a box having an opening at the top, with strips of thick fabric extending along the edges of the box for the purpose of retention of shape, the surfaces of the box being formed of a net. Therefore, the basket 206 has pliability. This is for the purpose of allowing the folding of the baby carriage and also the basket 206 itself.

In order to support the bottom of the basket 206 and regulate the shape of the basket 206, support member 207 extend rearwardly from the rear leg connecting rod 10. The support members 207 are useful particularly when relatively heavy baggage is received in the basket 206.

The folding operation on the basket 206 will now be described in connection with the folding operation on the baby carriage. When the baby carriage is folded, the pusher rod support angle bars 14 are turned in the direction of arrow 17 until they extend along the lower halves of the rear legs 4. If attention is given to this operation, it will be understood that the distance between the pivot points 201 and 205 decreases. Accordingly, as can be seen from comparison between FIGS. 2 and 3, the upper side rods 204 are turned counterclockwise around the pivot points 203, thus drawing the L-shaped lateral rods 202 toward the pusher rod bodies 6. This state, as is clear from FIG. 3, is such that the basket thus folded is substantially within the confines of the space for the folding of the baby carriage. Further during the folding of the baby carriage, the pair of pusher rod bodies 6 and the pair of rear legs 4 respectively approach each other while reducing the width. This movement is not obstructed by the structure associated with the basket 206 since the pair of upper side rods 204 are separated from each other. Further, the support members 207 are displaced with the rear legs 10 and brought to a position shown in FIG. 3, being substantially within the confines of the space for the folding of the baby carriage. In addition, since the basket 206 is of pliable construction, it will advantageously follow the movement or displacement of the L-shaped lateral rods 202 and upper side rods 204 and will be suitably deformed.

The baby carriage of basic construction described so far may have various functions, in addition to the basket described above, affixed thereto, an example of such modification being described below.

Figure 38:
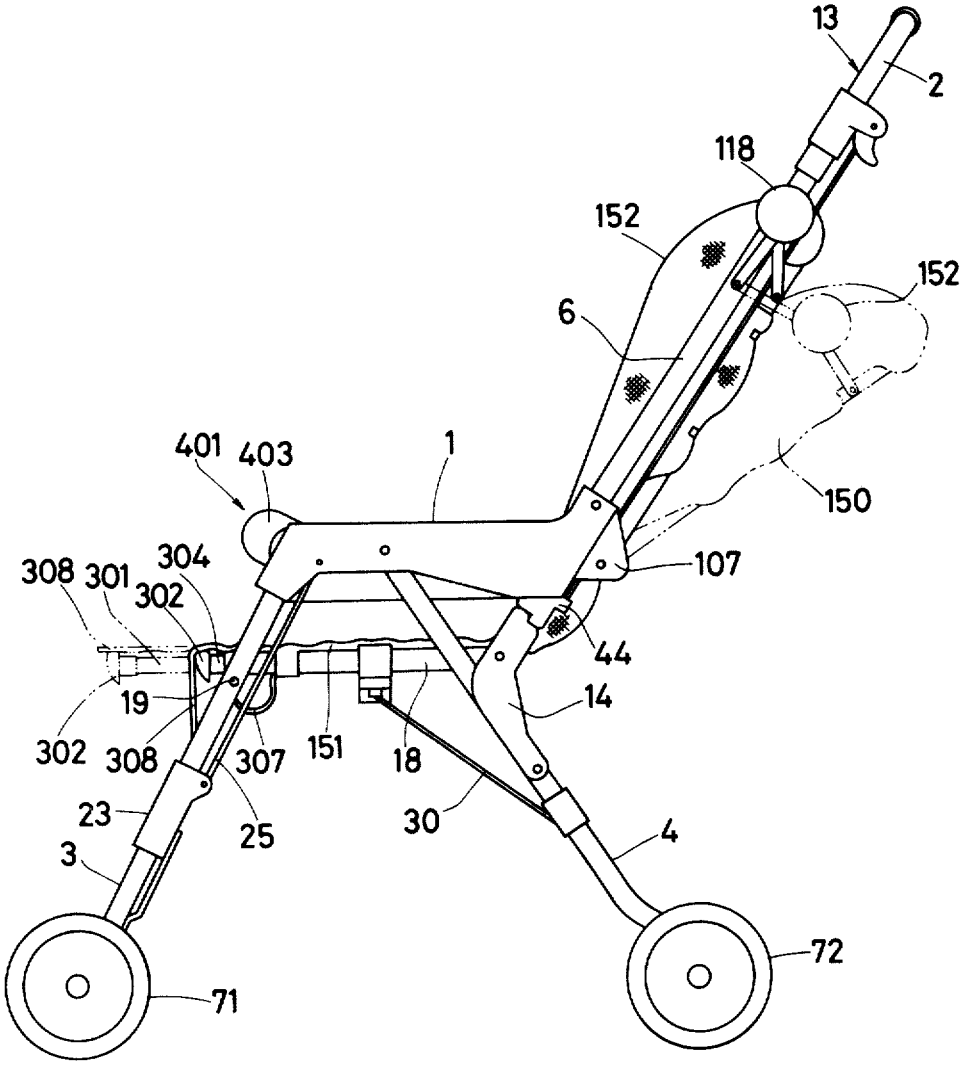
FIG. 38 is a right-hand side view showing a seat extending function and a torso guard 401 attached to the basic structure of the baby carriage shown in FIG. 1.
Figure 39:
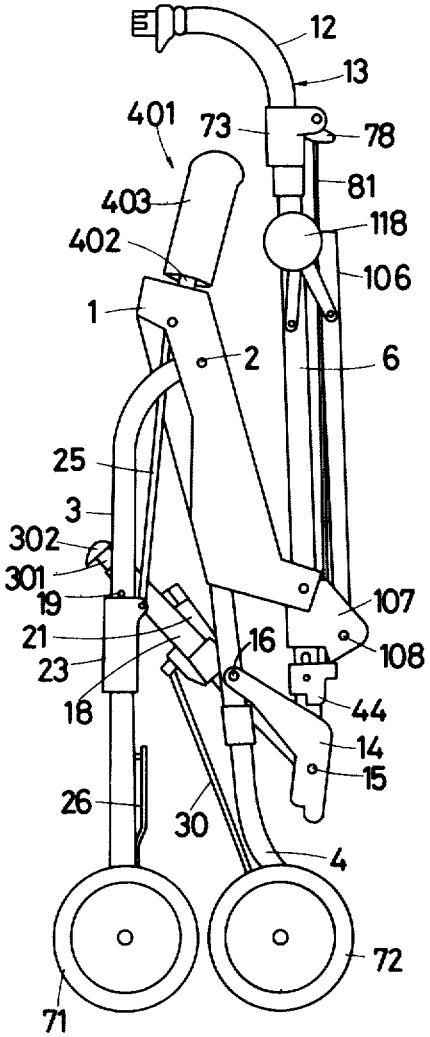
FIG. 39 is a right-hand side view of the baby carriage of FIG. 38 in its closed state.
Figure 40:
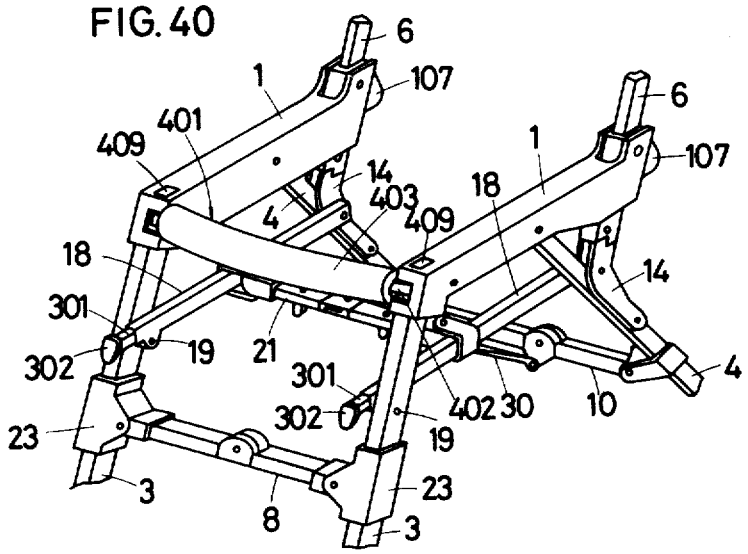
FIG. 40 is a perspective view diagrammatically showing the middle region of the baby carriage of FIG. 38.

FIG. 38 is a right-hand side view showing a seat extending function and a torso guard 401 attached to the basic structure of the baby carriage shown in FIG. 1. FIG. 39 is a right-hand side view of the baby carriage in its closed state. FIG. 40 is a perspective view diagrammatically showing the middle region of the baby carriage. As shown in these figures, it is possible to attach a seat extending function and a torso guard to the baby carriage of basic construction shown in FIGS. 1, etc.

Figure 41:
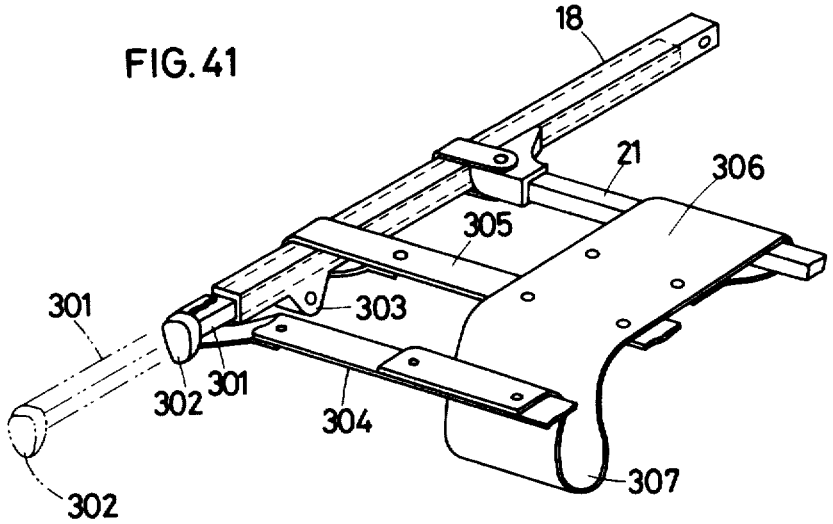
FIG. 41 is a perspective view of an arrangement adjacent folding operative connecting rods 18, illustrating the seat extending function of the baby carriage of FIG. 38.

First, the seat extending function will be described. FIG. 41 is a perspective view of an arrangement adjacent folding operative connecting rods 18, illustrating the seat extending function of the baby carriage of FIG. 38. Referring to FIGS. 38 through 41, folding operative connecting rods 18 are formed of hollow pipes. Each folding operative connecting rod 18 has a slider 301 in the form of a bar slidably inserted therein. The front end of the slider 301 is formed with an operating portion 302 so that the operator may engage his finger with it to draw out the slider 301 or he may push it with the hand to bring the slider 301 back to its retracted position. In addition, in order to allow the slider 301 to slide within the folding operative connecting rod 18, the latter is formed with a bracket 303 and said pivot pin 19 is inserted through said bracket 303. A belt 304 for reinforcement is stretched between the front ends of the right and left sliders 301. Further, a belt 305 for reinforcement is also stretched between the right and left folding operative connecting rods 18 forwardly of the central connecting rod 21. A wide belt 306 extending in a direction which crosses the belts 304 and 305 is fixed so as to connect the belts 304, 305 and central connecting rod 21. In addition, when the sliders 301 are not drawn out, there is a sag 307 in the wide belt 306. Thus, the length of the wide belt 306 is determined such that the end of the drawing-out of the sliders 301 is defined with said sag 307 straightened out. The seat 151 described above is formed on these belts 304, 305, 306 and central connecting rod 21. As best shown in FIG. 38, the seat 151 includes a seat extension 308 sagging from the front end thereof.

The seat extension 308 is actually used when the back rest 150 of the hammock is lowered into a bed form, as shown in phantom lines in FIG. 38. That is, it is more comfortable for the baby to straighten its legs when the hammock takes a bed form. Thus, if the sliders 301 are drawn out by means of the operating portions 302, the seat extension 308 is positioned on the belt 304 and the front end of wide belt 306 and extends horizontally. This allows the baby to straighten its legs on the seat extension 308. If the back rest 150 of the hammock is raised into a chair form, the seat extension 308 becomes unnecessary. In this case, if the sliders 301 are pushed in by means of the operating portions 302, the seat extension 308 is brought into its sagging state, thus allowing the baby to hang down its legs or place its feet on the foot rest.

Figure 42:
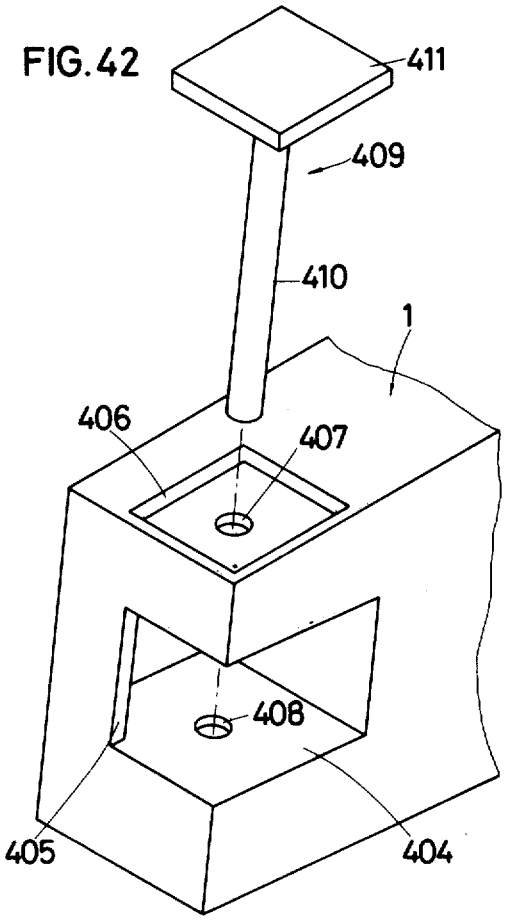
FIG. 42 is a perspective view of the front end portion of a support leg pusher rod connecting rod 1, for explanation of the torso guard 401 of the baby carriage of FIG. 38.
Figure 43:
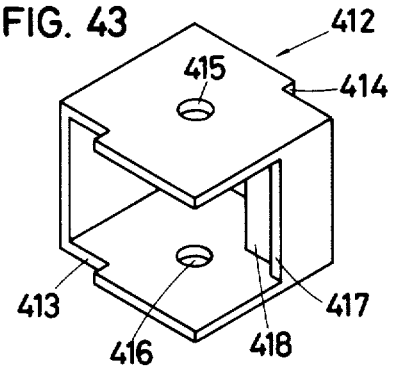
FIG. 43 is a perspective view of an insert 412 adapted to be built in a recess 404 shown in FIG. 42.
Figure 44:
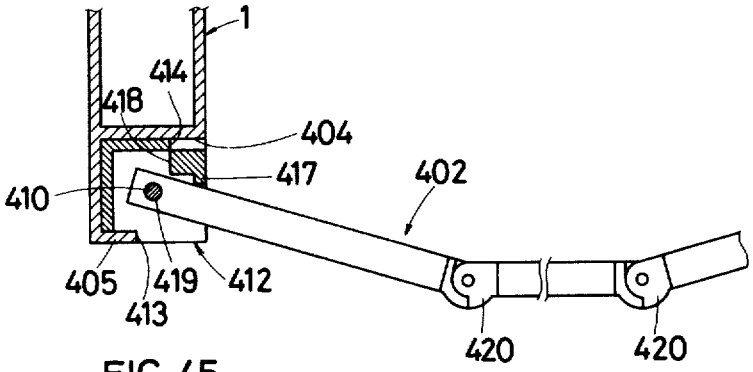
FIGS. 44 and 45 are plan views, partly in section, illustrating the operation of an arbor 402 included in the torso guard 401.
Figure 45:
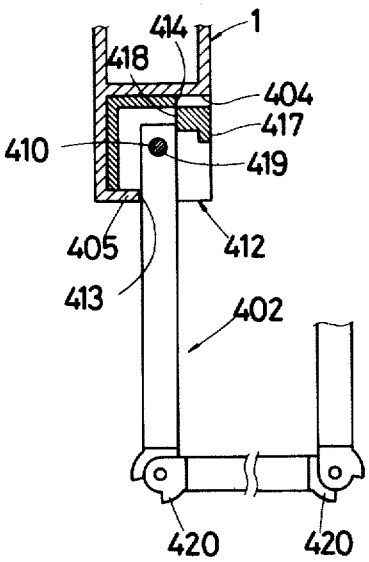
Figure 46:
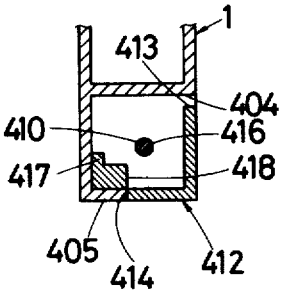
FIG. 46 is a sectional view showing the manner in which the insert 412 is fitted in the recess 404 when the torso guard 401 is removed.

The torso guard 401 will now be described. FIG. 42 is a perspective view of a support leg pusher rod connecting rod 1, for explanation of the torso guard 401. FIG. 43 is a perspective view of an insert 412 adapted to be built in a recess 404 shown in FIG. 42. FIGS. 44 and 45 are plan views, partly in section, illustrating the operation of an arbor 402 included in the torso guard 401. FIG. 46 is a sectional view showing the manner in which the insert 412 is fitted in the recess 404 when the torso guard 401 is removed.

Referring to FIGS. 38 through 40 and FIGS. 42 through 46, the torso guard 401 comprises an arbor 402 and a cushion member 403 placed on the arbor 402 to cover the latter. The cushion member 403 is made of a material which is elastic and foldable, such as urethane foam. The arbor 402 is connected between the front ends of a pair of support leg pusher rod connecting rods 1.

Referring to FIG. 42, there is formed a recess 404 which extends from a portion of the front surface of the front end of a support leg pusher rod connecting rod 1 to a portion of the inner surface thereof. The recess 404 has a portion of its opening closed by a wall 405 having a predetermined size. The upper surface of the front end portion of the support leg pusher rod connecting rod 1 is formed with a recess 406 which is, for example, rectangular. The bottom wall of the recess 406 is formed with a circular throughgoing hole 407. A circular throughgoing hole 408 is formed in the lower surface wall of the recess 404 coaxially with said circular throughgoing hole 407. The stem portion 410 of a flanged pin 409 is inserted into the circular throughgoing holes 407 and 408. In this state, the flange portion 411 of the flanged pin 409 intimately fits in the recess 406. Therefore, the flanged pin 409 will not easily slip off, and where it is desired to pull it out, the lower end of the stem portion 410 may be struck with a hammer or the like. In addition, the direction in which the common axis of the throughgoing holes 407 and 408 faces, that is, the direction in which the stem portion 410 faces is not perpendicular to the horizontal upper surface of the support leg pusher rod connecting rod 1 but is slightly inclined with respect to the same.

Referring to FIG. 43, an insert 412 has a shape adapted for said recess 404. More particularly, in its external shape it is provided with a notch 413 for receiving said wall 405. A second notch 414 is formed at a position symmetrical to the notch 413. The function of this second notch 414 will be later described. The insert 412 has an opening formed substantially in two of its four surfaces and its interior is substantially hollow. The upper and lower walls of the insert 412 are provided with circular throughgoing holes 415 and 416 extending along the axis thereof. One side of the opening extending substantially over two surfaces of the inert 412 is defined by a wall 417, from which a projecting wall 418 extends into the interior of the insert 412.

The insert 412 is fitted in the recess 404 shown in FIG. 42, with the wall 405 received in the first notch 413 so that the insert 412 does not project beyond the recess 404. The four circular throughgoing holes 407, 415, 416 and 408 are aligned with each other on a single axis.

In FIGS. 44 and 45, the insert 412 is shown as fitted in the recess 404. In this state, the associated end of the arbor 402 is inserted in the insert 412. The end of the arbor 402 is formed with a circular throughgoing hole 419 and, with said throughgoing hole 401 aligned with said throughgoing holes 407, 415, 416 and 408, the stem portion 410 of the flanged pin 409 is inserted therein to pivotally support the arbor 402 thereon.

The arbor 402 has foldable portions 420 at two places. The structure of the foldable portions is such as to allow only folding from the FIG. 44 state to the FIG. 45 state. Further, the arbor is constructed to extend along a slightly forwardly curved line when the foldable portions 420 are extended to the maximum degree.

In the folding operation on this baby carriage already described, when the baby carriage is closed, the pair of support leg pusher rod connecting rods 1 approach each other. Along with this movement, the arbor 402 is folded at the foldable portions 420. The end of this folding is defined in that the lateral surface of the arbor 402 adjacent the end thereof abuts against the wall 405 and the projecting wall 418. In addition, even in the folded state, the cushion member 403 is likewise bent along the shape of the arbor 402 because it is made of a bendable material. The torso guard 401 in its folded state, as shown in FIG. 39, extends inwardly from the support leg pusher rod connecting rods 1 and is advantageously stored in the space occupied by the baby carriage in its folded state. This is because, as already described, the direction in which the stem portion 410 of the flanged pin 409 faces is not perpendicular to the horizontal upper surface of the support leg pusher rod connecting rod 1 but is slightly inclined with respect to the same.

When this baby carriage is opened, the pair of support leg pusher rod connecting rods 1 move away from each other. Along with this movement, the arbor 402 assumes its most extended state, as shown in FIG. 44. In this case, the lateral surface of the arbor 402 adjacent the end thereof abuts against the wall 417 to define the end of this operation.

The torso guard 401 is also arranged so that it can be removed when it becomes unnecessary. Simply, this could be achieved by extracting the flanged pin 409 and separating the arbor 402 of the torso guard 401 from the support leg pusher rod connecting rods 1. Such simple removal of the arbor 402, however, would leave the opening in the recess 404, which is undesirable from the standpoint of external appearance and also of safety as it would liable to cause the nipping of the finger. For this reason, as shown in FIG. 46, the insert 412 is once extracted from the recess 404 and then it is turned through 180° around the axis of the circular throughgoing holes 415 and 416 and fitted again in the recess 404. In this state, the portion of the insert 412 which is formed with a lateral wall covers the opening in the recess 404, with the wall 405 received in the second notch 414, thus establishing a closely fitted state. The stem portion 410 of the flanged pin 409 is then inserted so as to fix this state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage comprising: means for supporting the baby carriage with respect to the ground including a pair of front legs (3) each having a wheel (71), a pair of rear legs (4) each having a wheel (72), and connecting members (8, 10) for determining the distance between said front legs and between said rear legs; folding initiating means including a pair of pusher rod support angle bars (14) extending relatively upwardly and pivotally supported, each at its one end, on said pair of rear legs (4), and a pair of pusher rod means (6) pivotally connected at their lower ends to the other ends of said pusher rod support angle bars (14) and extending relatively vertically; connecting means (1, 18, 21, 23, 24, 25, 26, 30) operatively connected between said folding initiating means and said support means and so arranged that when said pusher rod support angle bars (14) are turned substantially downwardly in response to a downward displacement of said pusher rod means (6), said front legs, said rear legs and said connecting members are actuated for moving said front legs (3), said rear legs (4) and said pusher rod means (6) toward one another, said connecting means comprising a pair of front and rear leg supporting rods (1) including pivot means for pivotally supporting said pair of front legs (3) substantially at one end of said supporting rods (1) and said pair of rear legs (4) substantailly intermediate the ends of said supporting rods (1), said supporting rods (1) comprising substantially at the other end thereof further pivot means (5) for said push rod means (6), and wherein said connecting means further comprise a pair of connecting rod turning members (23) each slidably fitted on the respective front leg (3) in the central region thereof, a pair of bar links (25) connected between said pair of connecting rod turning members (23) and said pair of supporting rods (1) adjacent their front end, a pair of pivotally installed arms (26) extending inwardly from said pair of front legs (3), said *connecting members* (*8, 10*) *of said* carrage [further comprising] *supporting means including a* downwardly foldable front leg connecting [means] *member* (8) pivotally supported at its opposite ends by said connecting rod turning members (23) and also pivotally supported by said arms (26) at pivots points (27) spaced a predetermined distance from each end of said front leg connecting [means] *members* (8).

2. A baby carriage as set forth in claim 1, wherein said connecting means further includes a pair of folding connecting rods (18) pivotally secured at their opposite ends to said front legs (3) and to said pusher rod support angle bars (14).

3. A baby carriage as set forth in claim 2, wherein said connecting [means further] *members* include a rear leg connecting rod (10) adapted to be downwardly foldable intermediate its ends and pivotally supported at its opposite ends by the lower portions of said pair of rear legs (4).

4. A baby carriage as set forth in claim 3, wherein said connecting means further include a central connecting rod (*21*) adapted to be forwardly foldable intermediate its ends and pivotally supported at its opposite ends by the central portions of said pair of folding connecting rods (18), and a pair of tie rods (30) arranged in a V-shape between the foldable portion of said rear leg connecting rod (10) and pivot points (31, 32, 33) spaced a predetermined distance from the foldable portion of said central connecting rod (21) on each side thereof.

5. A baby carriage as set forth in claim 1, further including sleeves (44) axially slidably fitted on the lower end portions of said pair of pusher rod bodies (6), and means urging said sleeves (44) into engagement with the other ends of said pusher rod support angle bars (14) to thereby fix the angle formed between said pusher rod support angle bars (14) and said pusher rod bodies (6).

6. A baby carriage as set forth in claim 5, further including operating means (41, 48 or 78, 81) for disengaging said sleeves (44) from the other ends of said pusher rod support angle bars (14).

7. A baby carriage as set forth in claim 1, further including a pusher rod connecting member (12) adapted to be foldable intermediate its ends and pivotally connected at its opposite ends to said pair of pusher rod bodies (6), the axes of the attaching portions of said pusher rod connecting member (12) with respect to said pusher rod bodies (6) being aligned with the axes of said pusher rod bodies (6).

8. A baby carriage as set forth in claim 7, further including means (40, 43 or 75, 80) for inhibiting the turning of said pusher rod connecting member (12) with respect to said pusher rod bodies (6).

9. A baby carriage as set forth in claim 1, further comprising a hammock including a back rest and a seat, and a reclining mechanism (101, 102, 106) operatively hinged to said pusher rod means (6) for supporting said back rest in such a manner as to permit adjusting *of* a reclining angle of said back rest.

10. A baby carriage as set forth in claim 9, wherein said reclining mechanism includes back rest retaining rods (106) which retain said back rest and which are pivotally supported at their lower ends at the lower regions of said pusher rod bodies (6), and further connecting means connected between positions spaced a predetermined distance from the lower ends of said back rest retaining rods (106) and said pusher rod bodies (6) for determining the angle of inclination of said back rest retaining rods (106).

11. A baby carriage as set forth in claim 10, wherein further [connecting] *said connected* means includes first and second connecting rods (101, 102) pivotally connecting together, and a locking member (115) pivotally supported by said first connecting rod (101) and fixing the angle formed between said first and second connecting rods (101, 102), said second connecting member (102) being formed at different positions with first and second engaged members (113, 114) adapted to be selectively engaged by said locking member (115) according to the turning of the latter so as to fix first and second folded states of said first and second connecting rods (101, 102).

12. A baby carriage as set forth in claim 11, further including a cover (118) for covering the connected portions of said first and second connecting rods (101, 102) and said locking member (115), said cover (118) being attached to said locking member (115) so as to turn with the latter.

13. A baby carriage as set forth in claim 11, further including a head guard formed on the upper end of said back rest, and a head guard retaiing rod (130) retaining said head guard and pivotally supported by said back rest retaining rods (106) at the upper portions of the latter and fixedly secured to said first connecting rod (101), whereby in said first folded state, said back rest retaining rod (106) is in its raised position with said head guard being substantially aligned with said back rest retaining rod (106), while in said second folded state said back rest retaining rod (106) is in its lowered state with said head guard retaining rod (130) extending in a direction which crosses said back rest retaining rod (106).

14. A baby carriage as set forth in claim 1, further including a basket (206) which comprises a pair of L-shaped lateral rods (202) pivotally supported at pivot points (201) spaced a predetermined distance from the lower ends of said rear legs (4) and extending rearwardly and then upwardly, a pair of upper side rods (204) pivotally supported at their ends by the upper ends of said L-shaped lateral rods (202) and the central portions of said pusher rod bodies (6), and a pliable material which is retained by said L-shaped lateral rods (202) and said upper side rods (204) and whose opposite lateral surfaces are defined by said L-shaped lateral rods (202) and said upper side rods (204).

*15. A baby carriage comprising means for supporting the baby carriage with respect to the ground including a pair of front legs (3) each having a wheel (71), a pair of rear legs (4) each having a wheel (72), and connecting members (8, 10) for determining the distance between said front legs and between said rear legs; folding initiating means including a pair of pusher rod support angle bars (14) extending relatively upwardly and pivotally supported, each at its one end, on said pair of rear legs (4) and a pair of pusher rod means (6) pivotally connected at their lower ends to the other ends of said pusher rod support angle bars (14) and extending relatively vertically; connecting means (1, 18, 21, 23, 24, 25, 26, 30) operatively connected between said folding initiating means and said support means and so arranged that when said pusher rod-support angle bars (14) are turned substantially downwardly in response to a downward displacement of said pusher rod means (6), said front legs, said rear legs and said connecting members are actuated for moving said front legs (3), said rear legs (4) and said pusher rod means (6) toward one another, said connecting means comprising a pair of front and rear leg supporting rods (1) including pivot means for pivotally supporting said pair of front legs (3) substantially at one end of said supporting rods (1) and said pair of rear legs (4) substantially intermediate the ends of said supporting rods (1), said supporting rods (1) comprising substantially at the other end thereof further pivot means (5) for said push rod means (6), and wherein said connecting members comprise a rear leg connecting rod (10) adapted to be downwardly foldable intermediate its ends and pivotally supported at its opposite ends by the lower portions of said pair of rear legs (4), so that in the folded condition all wheels are at the same level.*

*16. The baby carriage as set forth in claim 15, wherein said connecting means further includes a pair of folding connecting rods (18) pivotally secured at their opposite ends to said front legs (3) and to said pusher rod support angle bars (14).*

17. The baby carriage as set forth in claim 16, wherein said connecting means further include a central connecting rod (21) adapted to be forwardly foldable intermediate its ends and pivotally supported at its opposite ends by the central portions of said pair of folding connecting rods (18), and a pair of tie rods (30) arranged in a V-shape between the foldable portion of said rear leg connecting rod (10) and pivot points (31, 32, 33) spaced a predetermined distance from the foldable portion of said central connecting rod (21) on each side thereof.

18. The baby carriage as set forth in claim 15, further including sleeves (44) axially slidably fitted on the lower end portions of said pair of pusher rod means (6), and means urging said sleeves (44) into engagement with the other ends of said pusher rod support angle bars (14) to thereby fix the angle formed between said pusher rod support angle bars (14) and said pusher rod means (6).

19. The baby carriage as set forth in claim 18, further including operating means (41, 48 or 78, 81) for disengaging said sleeves (44) from the other ends of said pusher rod support angle bars (14).

20. The baby carriage as set forth in claim 15, further including a pusher rod connecting member (12) adapted to be foldable intermediate its ends and pivotally connected at its opposite ends to said pair of pusher rod means (6), the axes of the attaching portions of said pusher rod connecting member (12) with respect to said pusher rod means (6) being aligned with the axes of said pusher rod means (6).

21. The baby carriage as set forth in claim 20, further including means (40, 43 or 75, 80) for inhibiting the turning of said pusher rod connecting member (12) with respect to said pusher rod means (6).

22. The baby carriage as set forth in claim 15, further comprising a hammock including a backrest and a seat, and a reclining mechanism (101, 102, 106) operatively hinged to said pusher rod means (6) for supporting said backrest in such a manner as to permit adjusting a reclining angle of said backrest.

23. The baby carriage as set forth in claim 22, wherein said reclining mechanism includes backrest retaining rods (106) which retain said backrest and which are pivotally supported at their lower ends at the lower regions of said pusher rod means (6), and further connecting means connected between positions spaced a predetermined distance from the lower ends of said backrest retaining rods (106) and said pusher rod means (6) for determining the angle of inclination of said backrest retaining rods (106).

24. The baby carriage as set forth in claim 23, wherein further connecting means includes first and second connecting rods (101, 102) pivotally connecting together, and a locking member (115) pivotally supported by said first connecting rod (101) and fixing the angle formed between said first and second connecting rods (101, 102) said second connecting member (102) being formed at different positions with first and second engaged members (113, 114) adapted to be selectively engaged by said locking member (115) according to the turning of the latter so as to fix first and second folded states of said first and second connecting rods (101, 102).

25. The baby carriage as set forth in claim 24, further including a cover (118) for covering the connected portions of said first and second connecting rods (101, 102) and said locking member (115), said cover (118) being attached to said locking member (115) so as to turn with the latter.

26. The baby carriage as set forth in claim 24, further including a head guard formed on the upper end of said backrest, and a head guard retaining rod (130) retaining said head guard and pivotally supported by said backrest retaining rods (106) at the upper portions of the latter and fixedly secured to said first connecting rod (101), whereby in said first folded state said backrest retaining rod (106) is in its raised position with said head guard being substantially aligned with said backrest retaining rod (106), while in said second folded state, said backrest retaining rod (106) is in its lowered state with said head guard retaining rod (130) extending in a direction which crosses said backrest retaining rod (106).

27. The baby carriage as set forth in claim 15, further including a basket (206) which comprises a pair of L-shaped lateral rods (202) pivotally supported at pivot points (201) spaced a predetermined distance from the lower ends of said rear legs (4) and extending rearwardly and then upwardly and a pair of upper side rods (204) pivotally supported at their ends by the upper ends of said L-shaped lateral rods (202) and the central portions of said pusher rod means (6), and a pliable material which is retained by said L-shaped lateral rods (202) and said upper side rods (204) and whose opposite lateral surfaces are defined by said L-shaped lateral rods (202) and said upper side rods (204).

28. A baby carriage comprising means for supporting the baby carriage with respect to the ground including a pair of front legs (3) each having a wheel (71), a pair of rear legs (4) each having a wheel (72), and connecting members (8, 10) for determining the distance between said front legs and between said rear legs; folding initiating means including a pair of pusher rod support angle bars (14) extending relatively upwardly and pivotally supported, each at its one end, on said pair of rear legs (4), and a pair of pusher rod means (6) pivotally connected at their lower ends to the other ends of said pusher rod support angle bars (14) and extending relatively vertically; connecting means (1, 18, 21, 23, 24, 25, 26, 30) operatively connected between said folding initiating means and said support means and so arranged that when said pusher rod support angle bars (14) are turned substantially downwardly in response to a downward displacement of said pusher rod means (6), said front legs, said rear legs and said connecting members are actuated for moving said front legs (3), said rear legs (4) and said pusher rod means (6) toward one another, said connecting means comprising a pair of front and rear leg supporting rods (1) including pivot means for pivotally supporting said pair of front legs (3) substantially at one end of said supporting rods (1) and said pair of rear legs (4) substantially intermediate the ends of said suporting rods (1), said supporting rods (1) comprising substantially at the other end thereof further pivot means (5) for said push rod means (6), and wherein said connecting means further comprise a pair of folding connecting rods (18) pivotally secured at their opposite ends to said front legs (3) and to said pusher rod support angle bars (14), and wherein said connecting members include a rear leg connecting rod (10) adapted to be downwardly foldable intermediate its ends and pivotally supported at its opposite ends by the lower portions of said pair of rear legs (4), so that in the folded condition all wheels substantially are at the same level.

* * * * *

UNITED STATES PATENT AND TRADEMARK OFFICE

CERTIFICATE OF CORRECTION

PATENT NO. : Re. 31,760

DATED : December 11, 1984

INVENTOR(S) : Kenzou Kassai

It is certified that error appears in the above—identified patent and that said Letters Patent is hereby corrected as shown below:

In [57] ABSTRACT, line 4, after "rod" insert --body--.

Claim 1, column 20, line 40, replace "substantailly" by --substantially--;
line 52, replace "carrage" by --carriage--;
line 57, replace "pivots" by --pivot--.

Claim 11, column 21, line 53, replace "further said" by --said further--.

Claim 13, column 22, line 6, replace "retaiing" by --retaining--.

Claim 15, column 22, line 62, replace ", so that in the folded condition all wheels are at the same level." by --.--.

Claim 28, column 24, line 53, replace "suporting" by --supporting--;
line 56, delete "and";
line 64, replace "substantially are" by --are substantially--.

Signed and Sealed this

Fourteenth Day of May 1985

[SEAL]

*Attest:*

DONALD J. QUIGG

*Attesting Officer* *Acting Commissioner of Patents and Trademarks*